United States Patent [19]

Higaki

[11] Patent Number: 5,719,804
[45] Date of Patent: Feb. 17, 1998

[54] CACHE MEMORY DEVICE AND MANUFACTURING METHOD THEREOF

[75] Inventor: Naoshi Higaki, Kanagawa, Japan

[73] Assignee: Fujitsu Limited, Kawasaki, Japan

[21] Appl. No.: 677,533

[22] Filed: Jul. 10, 1996

[30] Foreign Application Priority Data

Jul. 26, 1995 [JP] Japan .................. 7-190104

[51] Int. Cl.$^6$ .................................. G11C 15/04
[52] U.S. Cl. ........................... 365/49; 365/189.05
[58] Field of Search .................. 365/49, 180, 174, 365/189.05; 395/425

[56] References Cited

U.S. PATENT DOCUMENTS

| | | | |
|---|---|---|---|
| 5,029,126 | 7/1991 | Yamaguchi | 365/49 |
| 5,226,009 | 7/1993 | Arimoto | 365/49 |
| 5,450,565 | 9/1995 | Nadir et al. | 365/49 |

Primary Examiner—Tan T. Nguyen
Attorney, Agent, or Firm—Armstrong, Westerman, Hattori, McLeland & Naughton

[57] ABSTRACT

A method is for manufacturing a cache memory device for writing cache data into and reading cache data from a storing region of a memory cell array designated according to a portion of an address signal and a selection signal from a ½ multiplexer. In a first step of the method, a common base of the ½ multiplexer applicable to both a direct-map type cache memory device and a set-associative type cache memory device is manufactured. Then, in a second step of the method, one of the direct-map type cache memory device and the set-associative type cache memory device is manufactured using the common base of the ½ multiplexer. The ½ multiplexer included in the direct-map type cache memory device outputs another portion of the address signal as the selection signal, and the ½ multiplexer included in the set-associative type cache memory device selectively outputs one of a write way signal and a read way signal as the selection signal according to a write enable signal.

15 Claims, 20 Drawing Sheets

CACHE MEMORY DEVICE AND MANUFACTURING METHOD THEREOF

BACKGROUND OF THE INVENTION

1. Field of the Invention

The present invention relates to a cache memory device and a manufacturing method thereof, and more specifically to a cache memory device which can be easily changed from a direct-map type (hereinafter referred to as DM type) to a set-associative type (hereinafter referred to as SA type), or from an SA type to a DM type, corresponding to a change requirement for a cache system, and a manufacturing method thereof.

2. Description of the Related Art

A cache device comprises a cache memory device, which stores data read from a main storage as cache data, and a cache tag device, which stores tags of the main storage and detects whether data read by the cache memory device is hit or not. When an address is sent from a CPU to the cache device, the cache memory device outputs data designated by an index included in the address from among the stored cache data. Simultaneously, the cache tag device identifies a tag designated by the index among the stored tags, and detects whether or not the identified tag corresponds to a tag included in the address sent from the CPU. If these tags correspond to each other, then, the cache tag device determines that the data output from the cache memory device is hit and outputs the determination result.

Of the three types of cache devices currently available; the DM type, SA type, and full-associative type cache devices, the DM type and SA type cache devices are most frequently used. The DM type cache device has the advantages of operation speed and control performance over the SA type cache device, while the SA type cache device has the advantage of a higher data-hitting rate over the DM type cache device.

FIG. 1 shows a configuration of a DM type cache device. As shown in this figure, entries of the cache tag device and those of the cache memory device of the DM type cache device are divided by the maximum number of the index, and the entries of the cache tag device are in a one-to-one correspondence with the entries of the cache memory device.

FIG. 2 shows a configuration of an SA type cache device. A two way type cache device is shown in this figure as an example. In the SA type cache device, each of the cache tag device and the cache memory device comprises entries of a two way configuration, which are divided by the maximum value of the index, as shown in FIG. 2. The entries of these devices also have a one-to-one correspondence with each other.

Flows of cache data in the DM type and SA type cache devices will be shown below using, as an example, cache devices in which 2048 data (or words) of 64 bits are stored.

FIG. 3 shows a flow of cache data according to the DM type cache device.

A cache memory device of the DM type cache device includes a memory cell array of 2k words by 64 bits, as shown in FIG. 3. The memory cell array is accessed by an address of 11 bits and cache data is read from the memory cell array according to the address. The validity of the read cache data is, then, determined according to a hit signal or a miss-hit signal sent from the cache tag device.

FIG. 4 shows a flow of cache data according to the SA type cache device.

As shown in this figure, a cache memory device of the SA type cache device includes a memory cell array of 1k words by 2 ways by 64 bits, which is accessed by an address of 10 bits. Two sets of cache data are read from the memory cell array according to the address and one of the two cache data read is selected according to a way signal of 1 bit sent from the cache tag device, so that valid cache data is output from the memory cell array.

When the number of ways increases, the number of bits of the way signal output from the cache tag device increases, and the number of bits of the address for accessing the cache memory device decreases, according to the set-associative system. For example, if a four way system is applied to the cache device, the cache tag device outputs a way signal of 2 bits and the cache memory device is accessed by an address of 9 bits.

These cache devices have a characteristic that the access speed increases as the number of bits in the row (ROW) direction and the number of bits in the column (COL) direction of the memory cell array become closer to one another, in other words, as the configuration of bits of the memory cell array gets closer to a square.

Therefore, for example, a memory cell array 1 having 256 bits in the ROW direction and 512 bits in the COL direction is used for a practical DM type cache memory device, as shown in FIG. 5. Eight (8) cache data of 64 bits are stored in each row of a memory cell array 1 of the DM type cache memory device. When the memory cell array 1 is accessed, a row is selected by a row address add[7:0] indicated by the lower order 8 bits of an address signal of 11 bits used for the access, and eight 64 bit regions included in the selected row are designated.

Sixty-four (64) ⅛ multiplexers 2, each of which performs 8 input and 1 output or 1 input and 8 output processes, select one 64 bit region (column), which is the destination of the access, in the selected row using a designation signal produced by a decoder 3 according to a column address add[10:8] indicated by the higher order 3 bits of the address signal.

When cache data is output from the cache memory device, 64 bits of cache data existing in the selected region of the memory cell array 1 is designated as read data dot[63:0] and output through sixty-four (64) sense amplifiers 5 and sixty-four (64) buffers 6, which respectively correspond to 64 bits of the read data dot[63:0]. The read data may be shown as complementary data sets of dot[63:0] and dox[63:0].

When data is written in the memory cell array 1, write data di[63:0] to be written is input to sixty-four (64) write amplifiers 4 and stored in a designated region of eight (8) regions in the selected row of the memory cell array 1 according to a write enable signal wex. The row address add[7:0], the column address add[10:8], write enable signal wex, and the write data di[63:0], are input through flip-flops FF.

The memory cell array 1 having, for example, 256 bits in the ROW direction and 512 bits in the COL direction, is also used for the practical SA type cache memory device, as shown in FIG. 6. When the memory cell array 1 is accessed, a row is selected by a row address add[7:0] indicated by the lower order 8 bits of an address signal of 10 bits, and eight 64 bit regions included in the selected row are designated.

Sixty-four (64) ⅛ multiplexers 2 select one 64 bit region (column), which is the destination of the access, in the selected row using a designation signal produced by a decoder 3 according to a column address add[9:8] indicated by the higher order 2 bits of the address signal, and a way signal of 1 bit output from a ½ multiplexer 7.

The ½ multiplexer 7 receives a write enable signal wex, a write way signal way_slw, and a read way signal way_slr. If the write enable signal wex indicates a write enable state, the ½ multiplexer 7 selects the write way signal way_slw, and if not, the read way signal way_slr is selected. The selected signal is output to the decoder 3.

When cache data is output from the cache memory device, 64 bit cache data existing in the selected region of the memory cell array 1 is designated as read data dot[63:0] and output through sixty-four (64) sense amplifiers 5 and sixty-four (64) buffers 6, which respectively corresponds to 64 bits of the read data dot[63:0].

When data is written in the memory cell array 1, write data di[63:0] to be written is input to sixty-four (64) write amplifiers 4 and stored in a designated region of eight (8) regions in the selected row of the memory cell array 1 according to the write enable signal wex. The row address add[7:0], the column address add[9:8], the write way signal way_slw, the write enable signal wex, and the write data di[63:0], are input through flip-flops FF.

The read way signal way_slr is generated by the cache tag device, while the write way signal way_slw is generated by a device which determines the write data using an algorithm of, for example, an LRU. Since different devices are used for generating the read way signal way_slr and the write way signal way_slw, the ½ multiplexer 7 is needed for the SA type cache memory device. The read way signal way_slr is determined in a reading cycle. However, a writing cycle starts after the write way signal way_slw is determined and set in a flip-flop FF. Therefore, a flip-flop FF is used for the write way signal way_slw, but is not used for read way signal way_slr.

Which of the DM type and SA type cache memory devices should be adopted in a cache system is decided at the design stage of the cache system, in consideration of the balance of a overall system. The SA type cache memory device as shown in FIG. 6 must comprise the ½ multiplexer 7, which is not needed for the DM type cache memory device as shown in FIG. 5. Therefore, the manufacturing method of the SA type cache memory device and that of the DM type cache memory device are completely different.

Accordingly, which of the DM type and SA type cache memory devices will be adopted in the cache system must be decided in the early stage of design, and this decision is not usually changed at the manufacturing stage for a conventional cache memory device. Even if a request for changing an SA type system to a DM type system, or changing a DM type system to an SA type system is made at the manufacturing stage or in the late stages of design, it is very difficult to change the type of the system according to such request, using conventional techniques. Even if a change is made in the designing stage or manufacturing stage, a large number of additional steps is required, thereby causing problems in that the cost and the manufacturing time of the system increase.

SUMMARY OF THE INVENTION

An object of the present invention is to provide a cache memory device which can be easily changed from a DM type to an SA type or from an SA type to a DM type corresponding to a change requirement for a cache system, and a manufacturing method thereof.

A further object of the invention is to provide an SA type cache memory device which can be easily changed to a DM type cache memory device, and a manufacturing method thereof.

A still further object of the invention is to provide a DM type cache memory device which can be easily changed to an SA type cache memory device, and a manufacturing method thereof.

A still further object of the present invention is to provide a ½ multiplexer adaptable to both an SA type cache memory device and a DM type cache memory device, and a manufacturing method thereof.

A still further object of the invention is to provide an SA type cache memory device and a DM type cache memory device which can realize rapid operations, and manufacturing methods thereof.

The method according to the invention is for manufacturing a cache memory device for writing cache data into and reading cache data from a storing region of a memory designated according to a selection signal (for example a most significant bit add[10] or a way signal) from a selecting unit (for example a ½ multiplexer)and a designation signal produced using a first portion of an address signal (for example address bits add[9:8]). The method includes a first step of manufacturing a common base of the selecting unit applicable to both a DM type cache memory device and an SA type cache memory device; and a second step of manufacturing one of a DM type cache memory device comprising the selecting unit which includes the common base and outputs a second portion of the address signal (for example the most significant bit add[10]) as the selection signal, and an SA type cache memory device comprising the selecting unit which includes the common base and selectively outputs one of a write way signal and a read way signal as the selection signal according to a write enable signal.

The method may further include a third step of changing the type of the cache memory device manufactured in the second step to the other type of cache memory device.

The first step may include steps of forming a transistor layer and forming a first metal layer, which are included in the common base, above the transistor layer, and the second step may include a step of forming a second metal layer above the first metal layer by a masking technique so that one of the wiring patterns of a DM type cache memory device and an SA type cache memory device is determined.

Further, the first step may include a step of forming a first transfer-gate circuit and a second transfer-gate circuit in the transistor layer, and the second step may include a step of forming, in the second metal layer, a first metal line and a second metal line, which are used for transmitting signals for bringing one of the first and the second transfer-gate circuits into conduction for outputting the selection signal, a third metal line for transmitting a first potential, and a fourth metal line for transmitting a second potential. The first and the third metal lines are adjacent to each other, and the second and the fourth metal lines are also adjacent to each other, in the second metal layer.

When the DM type cache memory device is manufactured in the second step, the first and the third metal lines and the second and the fourth metal lines are electrically connected each other, respectively, in the formed second metal layer, and the first and the third metal lines and the second and the fourth metal lines may be electrically isolated from each other, respectively, by use of a laser cutter in the third step.

When the SA type cache memory device is manufactured in the second step, the first and the third metal lines and the second and the fourth metal lines are electrically isolated from each other, respectively, and the first and the third metal lines and the second and the fourth metal lines may be electrically connected to each other, respectively, by use of an ion beam in the third step.

Another method according to the invention is for manufacturing a cache memory device for writing cache data into and reading cache data from a storing region of a memory designated according to a selection signal and a designation signal produced using the first portion of an address signal. The method includes the steps of: forming a write control logic circuit for generating a write region selection signal according to a write enable signal, and forming a write amplifier for designating a storing region of the memory for writing cache data according to the write region selection signal; and manufacturing one of an SA type cache memory device and a DM type cache memory device using the write control logic circuit and the write amplifier. In this manufacturing step, a line for inputting a write way signal into the write control logic circuit is formed when the SA type cache device is manufactured, and a line for inputting the second portion of the address signal into the write control logic circuit is formed when the DM cache memory device is manufactured.

Another method according to the invention is for manufacturing a ½ multiplexer used as selecting unit for a cache memory device for writing cache data into and reading cache data from a storing region of memory, designated according to a selection signal from the selecting unit and a designation signal produced using a portion of an address signal. The method includes; a first step of forming a transistor layer including a first transfer-gate circuit and a second transfer-gate circuit each comprising a signal input end, a first end for inputting a first operation signal, second end for inputting a second operation signal, and an output end for outputting a signal input from the signal input end in an operation state; and a second step of forming a metal layer including a first metal line connected to the first ends of the first and the second transfer-gate circuits, a second metal line connected to the second ends of the first and the second transfer-gate circuits, a third metal line for transmitting a first potential, and a fourth metal line for transmitting a second potential. The first and the third metal lines and the second and the fourth metal lines are adjacent to each other, respectively.

A DM type cache memory device according to the invention comprises; a memory for storing cache data; a selecting unit (for example a ½ multiplexer) having a first input end for inputting a first portion of the address signal (for example a most significant bit add[10]), a second input end, and an output end, for always selecting the first portion of the address signal and outputting the first portion of the address signal from the output end; and a write/read unit (for example a ⅛ multiplexer, write amplifier, sense amplifier, and a buffer) for designating a storing region of the memory according to the first portion of the address signal from the selecting unit and a second portion of the address signal (for example address bits add[9:8]), and writing cache data into and reading cache data from the designated storing region.

The selecting unit may comprise a first transfer-gate circuit connected between the first input end and the output end, and a second transfer-gate circuit connected between the second input end and the output end. The first transfer-gate circuit maintains the electrical connection between the first input end and the output end in conduction, and the second transfer-gate circuit maintains the electrical connection between the second input end and the output end in non-conduction.

The DM type cache memory device may further comprise a decoder for decoding the first portion of the address signal input from the selecting unit and the second portion of the address signal, for generating a designation signal. In this case, the write/read unit may designate a storing region of the memory according to the designation signal.

The decoder may decode the second portion of the address signal for generating a designation signal. In this case, the write/read unit comprises a first region designating unit (for example a ¼ multiplexer) for designating storing regions of the memory according to the designation signal output from the decoder, and a second region designating unit (for example a ½ multiplexer) for designating a storing region among the storing regions designated by the first region designating unit, according to the first portion of the address signal output from the selecting unit.

The DM type cache memory device may further comprise a sense amplifier formed between the first and second region designating unit.

The second input end of the selecting unit may be set in an electrically floating state.

The first portion of the address signal may correspond to a portion of a column address indicating a column in the memory and the second portion of the address signal may correspond to the other portion of the column address.

Another DM type cache memory device according to the invention comprises: a memory for storing cache data; a write control logic circuit for generating a write region selection signal according to the first portion of the address signal; a decoder for decoding the second portion of the address signal and generating a designation signal; a first region designating unit for designating storing regions of the memory according to the designation signal output from the decoder; and a write region designating unit for designating a storing region for writing cache data among the storing regions designated by the first region designating unit, according to the write region selection signal output from the write control logic circuit.

The DM type cache memory device may further comprise a read region designating unit for designating a storing region for reading cache data from among the storing regions designated by the first region designating unit, according to the first portion of the address signal.

The DM type cache memory device may further comprise a sense amplifier formed between the first region designating unit and the read region designating unit.

An SA type cache memory device according to the invention comprises: a memory for storing cache data; a selecting unit for outputting one of a write way signal and a read way signal as a selection signal; and a write/read unit for designating a storing region of the memory according to a portion of the address signal and the selection signal, and writing cache data into and reading cache data from the designated storing region. The selecting unit comprises a metal layer including a first metal line and a second metal line for transmitting a write-enable signal used for selecting one of the write way signal and the read way signal, a third metal line for transmitting a first potential, and a fourth metal line for transmitting a second potential. The first and the third metal lines and the second and the fourth metal lines being adjacent to each other, respectively.

Another SA type cache memory device according to the invention comprises: a memory for storing cache data; a decoder for decoding a portion of the address signal and generating a designation signal; a selecting unit for outputting one of a write way signal and a read way signal as a selection signal; a first region designating unit for designating storing regions of the memory according to the designation signal output from the decoder; and a second region designating unit for designating a storing region among the storing regions designated by the first region designating unit, according to the selection signal output from the selecting unit, and writing cache data into and reading cache data from the designated storing region.

The SA type memory device may further comprise a sense amplifier formed between the first and second region designating units.

Another SA type cache memory device according to the invention comprises: a memory for storing cache data; a decoder for decoding a portion of the address signal and generating a designation signal; a write control logic circuit for generating a write region selection signal according to a write way signal; a first region designating unit for designating storing regions of the memory according to the designation signal output from the decoder; and a write region designating unit for designating a storing region for writing cache data among the storing regions designated by the first region designating unit, according to the write region selection signal output from the write control logic circuit.

The SA type cache memory device may further comprise a read region designating unit for designating a storing region for reading cache data among the storing regions designated by the first region designating unit, according to a read way signal.

The SA type cache memory device may further comprise a sense amplifier formed between the first region designating unit and the read region designating unit.

A ½ multiplexer according to the invention is used as a selecting unit of a cache memory device for writing cache data into and reading cache data from a storing region of memory, designated according to a selection signal from the selecting unit and designation signal produced using a portion of an address signal. The ½ multiplexer comprises: a transistor layer including a first transfer-gate circuit and a second transfer-gate circuit each comprising a signal input end, a first end for inputting a first operation signal, second end for inputting a second operation signal, and an output end for outputting a signal input from the signal input end in an operation state; and a metal layer including a first metal line connected to the first ends of the first and the second transfer-gate circuits, a second metal line connected to the second ends of the first and the second transfer-gate circuits, a third metal line for transmitting a first potential, and a fourth metal line for transmitting a second potential. The first and the third metal lines and the second and the fourth metal lines are adjacent to each other, respectively.

When the ½ multiplexer is used for a DM type cache memory device, the first and the third metal lines and the second and the fourth metal lines are electrically connected each other, respectively.

When the ½ multiplexer is used for an SA type cache memory device, the first and the third metal lines and the second and the fourth metal lines are electrically isolated from each other respectively.

DESCRIPTION OF THE PREFERRED EMBODIMENT

Figure 1:
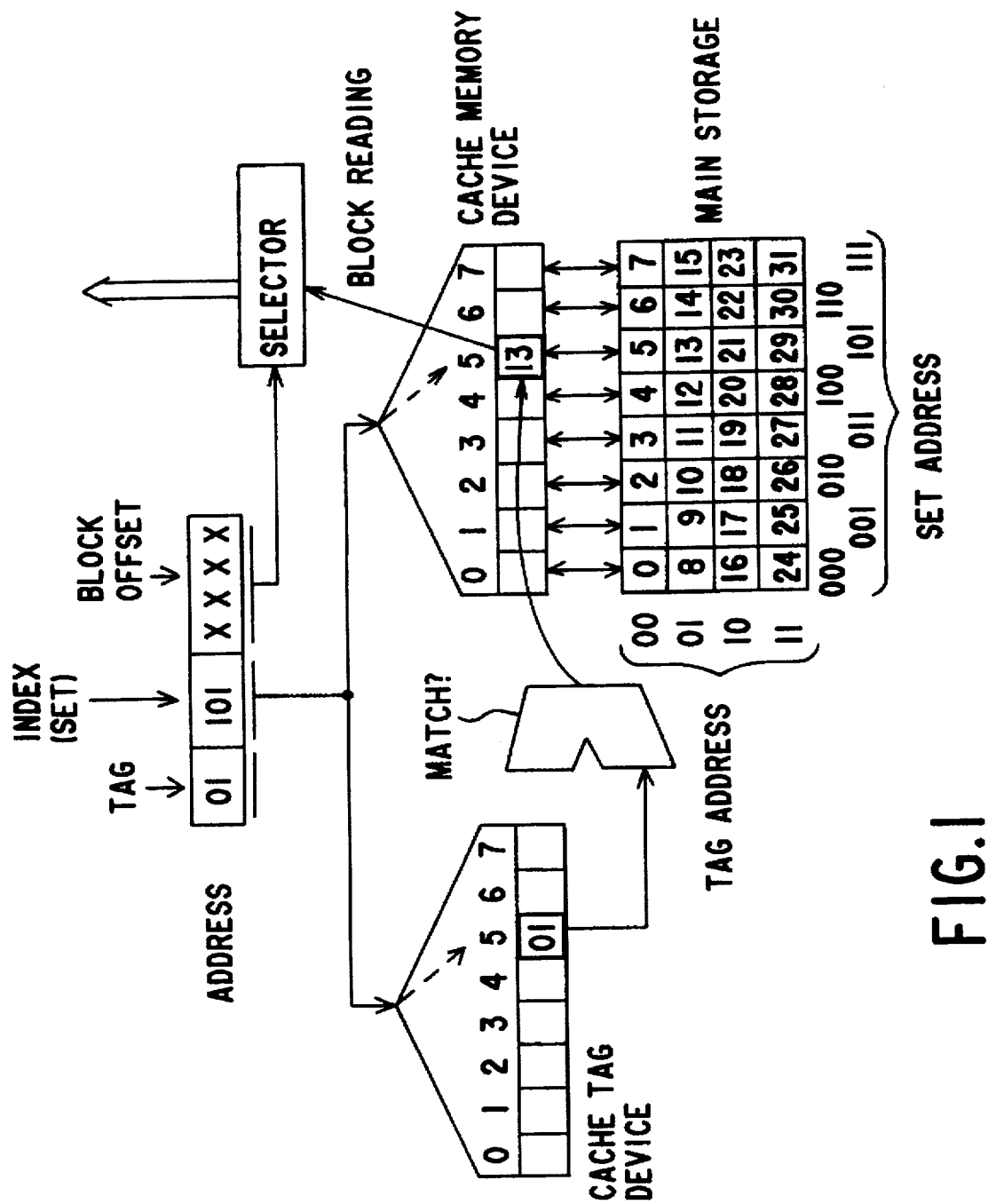
FIG. 1 shows a configuration of a DM type cache device.
Figure 2:
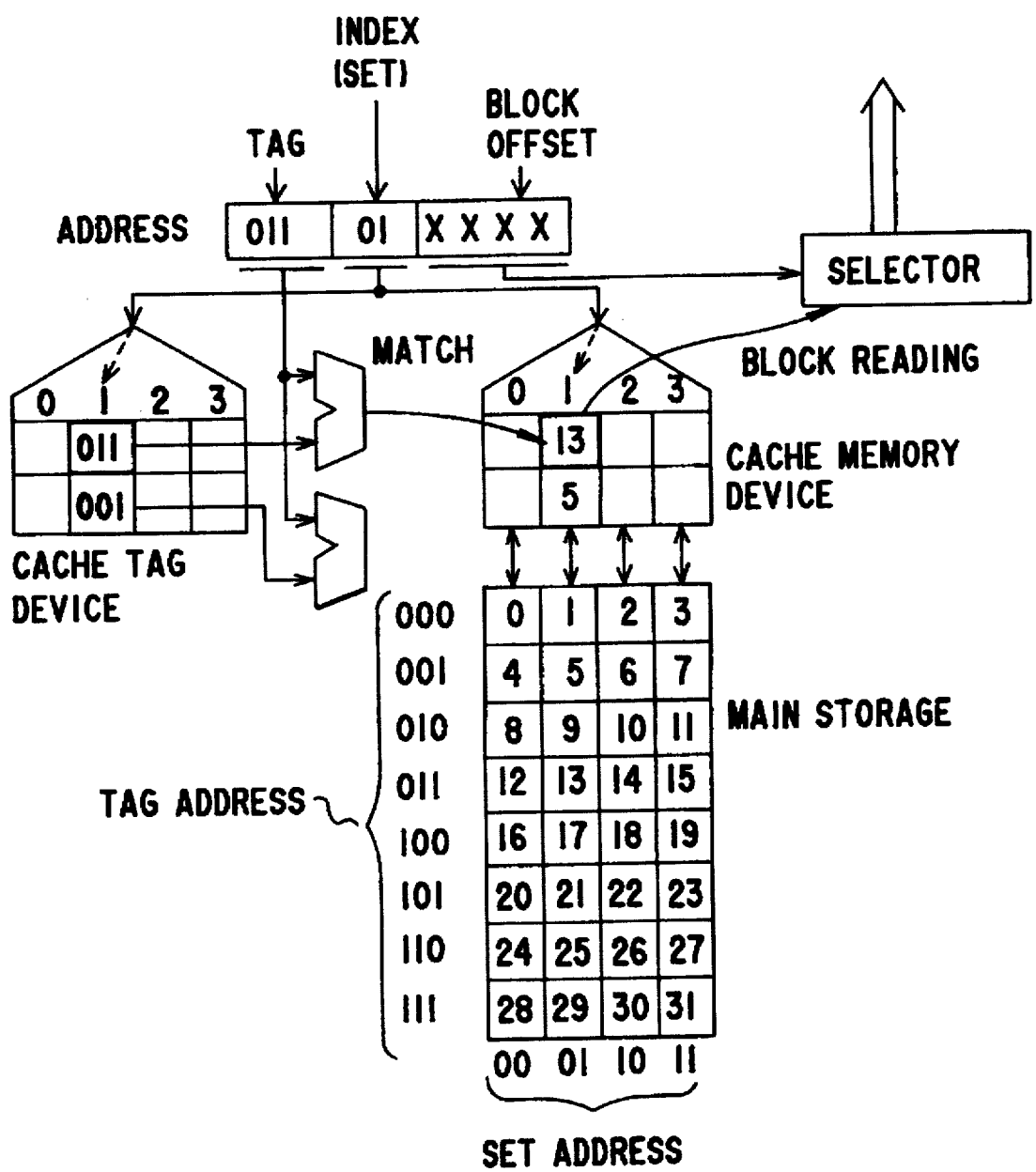
FIG. 2 shows a configuration of an SA type cache device.
Figure 3:
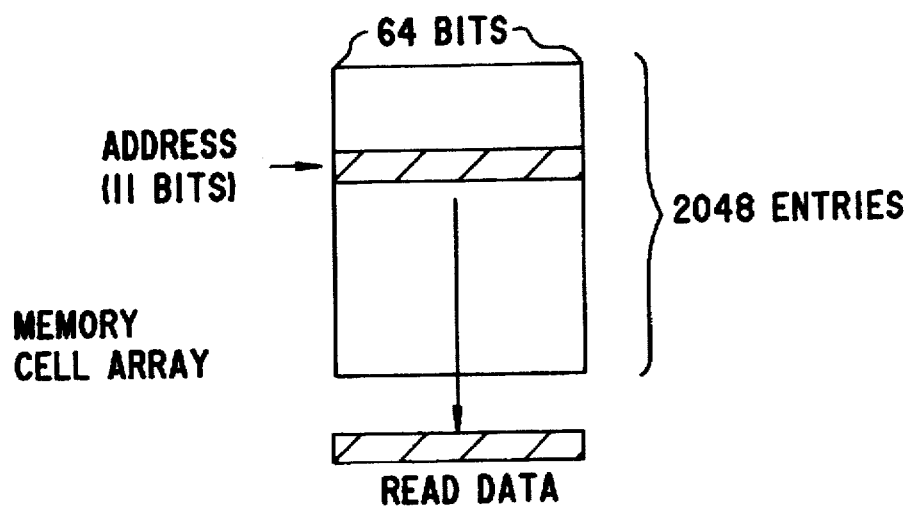
FIG. 3 shows a flow of cache data according to the DM type cache device.
Figure 4:
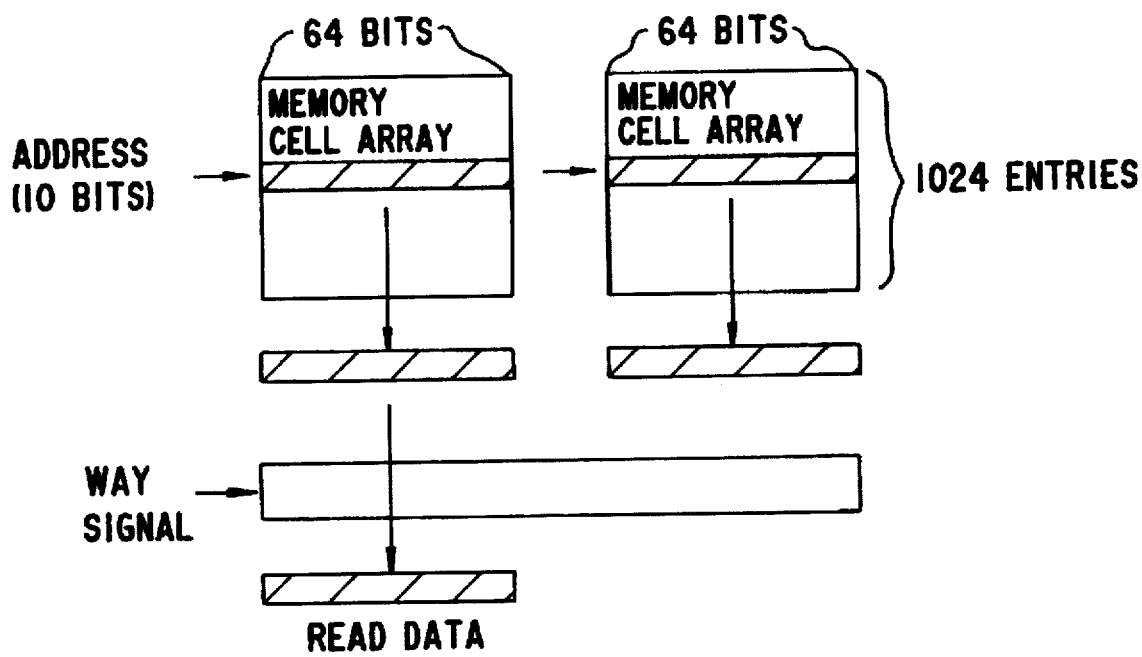
FIG. 4 shows a flow of cache data according to the SA type cache device.
Figure 5:
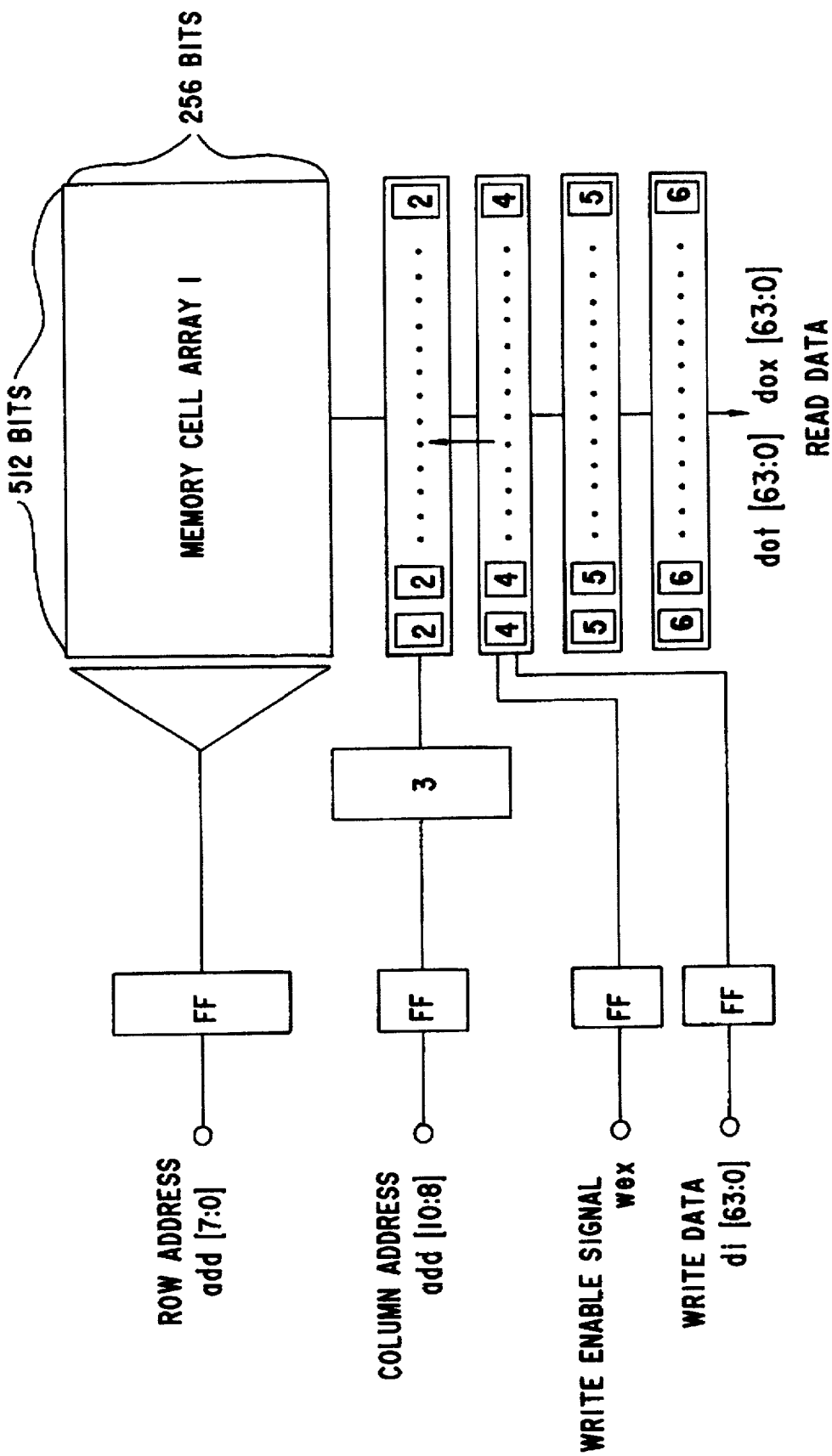
FIG. 5 shows a configuration of a DM type cache memory device.
Figure 6:
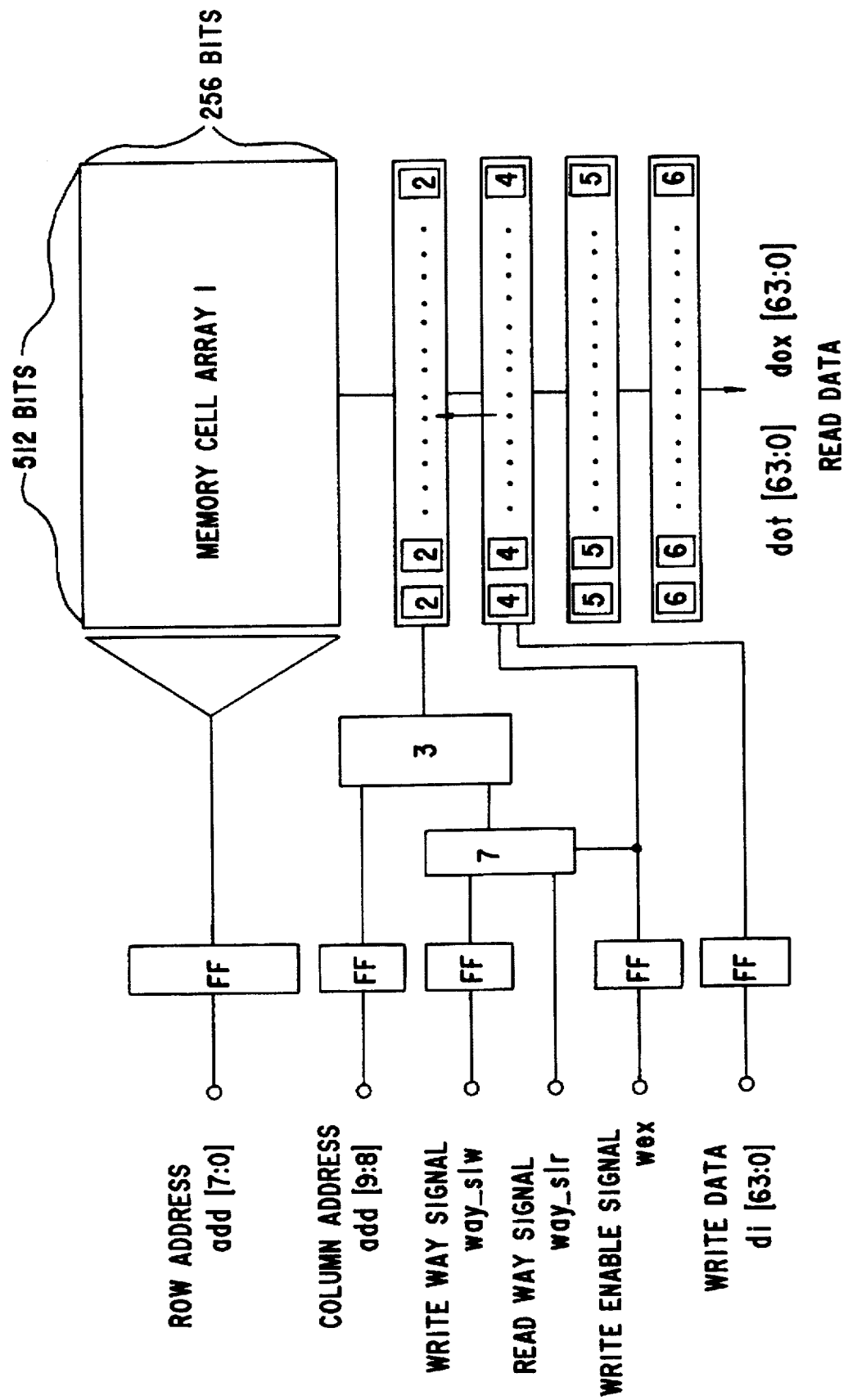
FIG. 6 shows a configuration of an SA type cache memory device.

Embodiments of the present invention will be described below. In the figures, same reference numerals and marks denote elements having the same functions.

Figure 7:
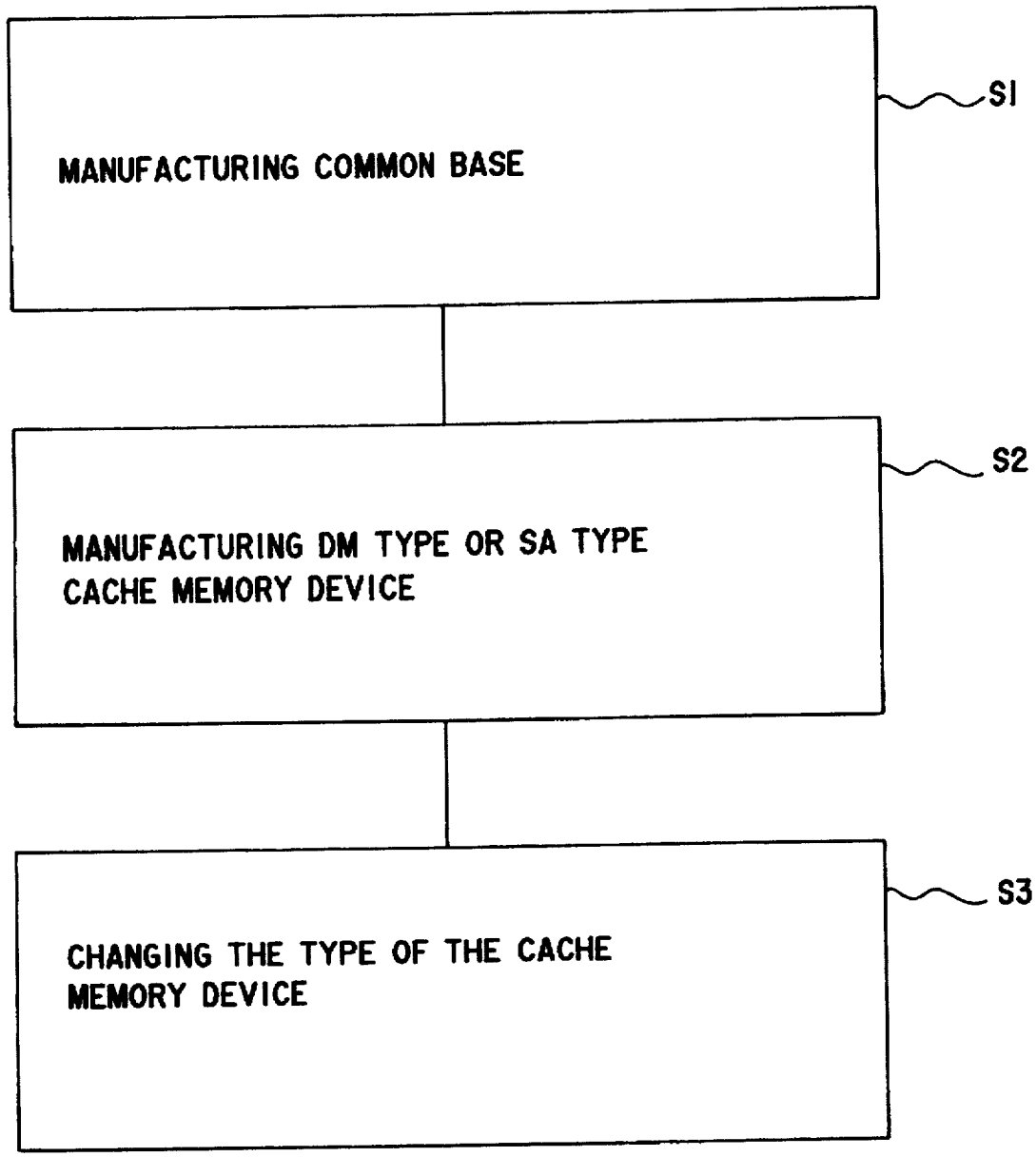
FIG. 7 shows fundamental steps of a method for manufacturing a cache memory device according to the invention.

FIG. 7 shows the fundamental steps of a method for manufacturing a cache memory device according to the invention. The method includes step S1 of manufacturing a common base (for example a bulk or a transistor layer) of a selecting unit which can be adapted to both a direct-map (DM) type cache memory device and a set-associative (SA) type cache memory device, and step S2 of manufacturing one of a DM type cache memory device and an SA type cache memory device which comprises the selecting unit (for example a ½ multiplexer) including the common base. The method may further include step S3 of changing the type of the cache memory device manufactured in step S2 by modifying the wiring form in the cache memory device. When an SA type cache memory device is manufactured in step S2, the device is changed to a DM type in step S3, and when a DM type cache memory device is manufactured in step S2, the device is changed to an SA type. A step of manufacturing the ½ multiplexer using the common base may be added between steps S1 and S2, dependently. Further, the selecting unit may be a logic circuit.

Figure 8:
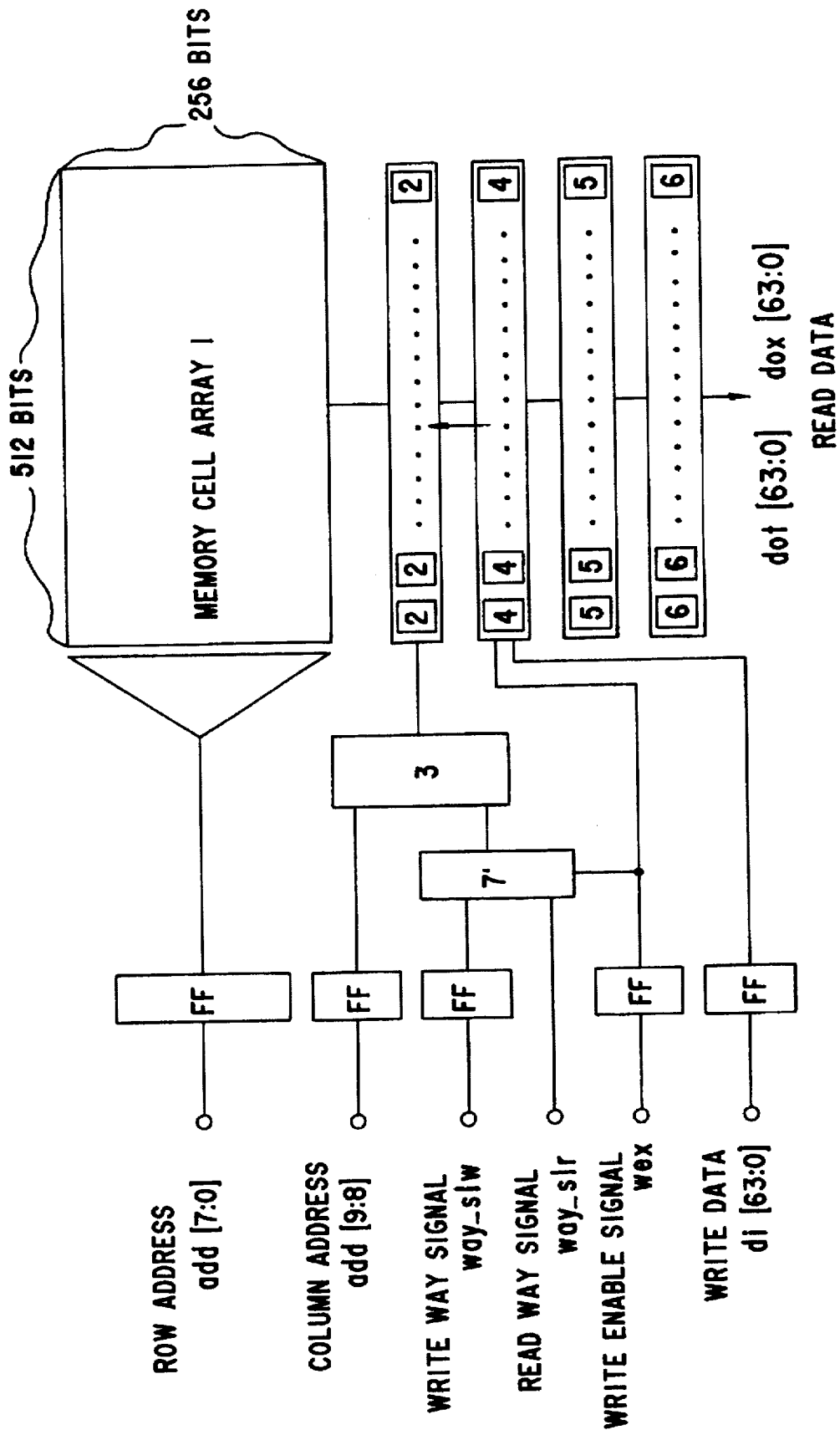
FIG. 8 shows a configuration of a first example of an SA type cache memory device according to the invention.

FIG. 8 shows a configuration of a first example of an SA type cache memory device according to the invention, which may be manufactured in step S2 or S3.

The SA type cache memory device comprises, a memory cell array 1 having 256 bits in the ROW direction and 512 bits in the COL direction and receiving row address add [7:0], sixty-four (64) ⅛ multiplexers 2 each of which performs 8 input and 1 output or 1 input and 8 output processes, a ½ multiplexer 7' used as a selecting unit in this example; a decoder 3 for producing a designation signal; sixty-four (64) write amplifiers 4; sixty-four (64) sense amplifiers 5; and sixty-four (64) buffers 6. The configuration of the ½ multiplexer 7' will be described in detail in a later section.

The ⅛ multiplexers 2 designate a region, which is the destination of the access, in a row selected by the row address, according to the designation signal produced by the decoder 3. The ½ multiplexer 7' receives a write enable signal wex, a write way signal way__slw, and a read way signal way__slr, selects one of the write way signal way__slw and the read way signal way__slr according to the write enable signal wex, and outputs the selected signal as a selection signal, the write way signal way__slw being selected when the write enable signal wex indicates a write enable state, and the read way signal way__slr being selected when the write enable signal wex does not indicate the write enable state. The write way signal way__slw and the read way signal way__slr may be referred to as way signals.

The decoder 3 receives and decodes address bits add[9:8], which correspond to a column address, included in an address signal and a way signal sent from the ½ multiplexer 7', and outputs the decoded signals to the ⅛ multiplexers 2 as the designated signal. The ⅛ multiplexers 2 select cache data to be output from the memory cell array 1 according to the designated signal. The selected cache data is output from the cache memory device as read data dot[63:0] through the sense amplifiers 5 and the buffers 6.

When data is written in the memory cell array 1, write data di[63:0] to be written is input to write amplifiers 4 and stored in a region designated by the ⅛ multiplexers 2, according to a write enable signal wex.

Figure 9:
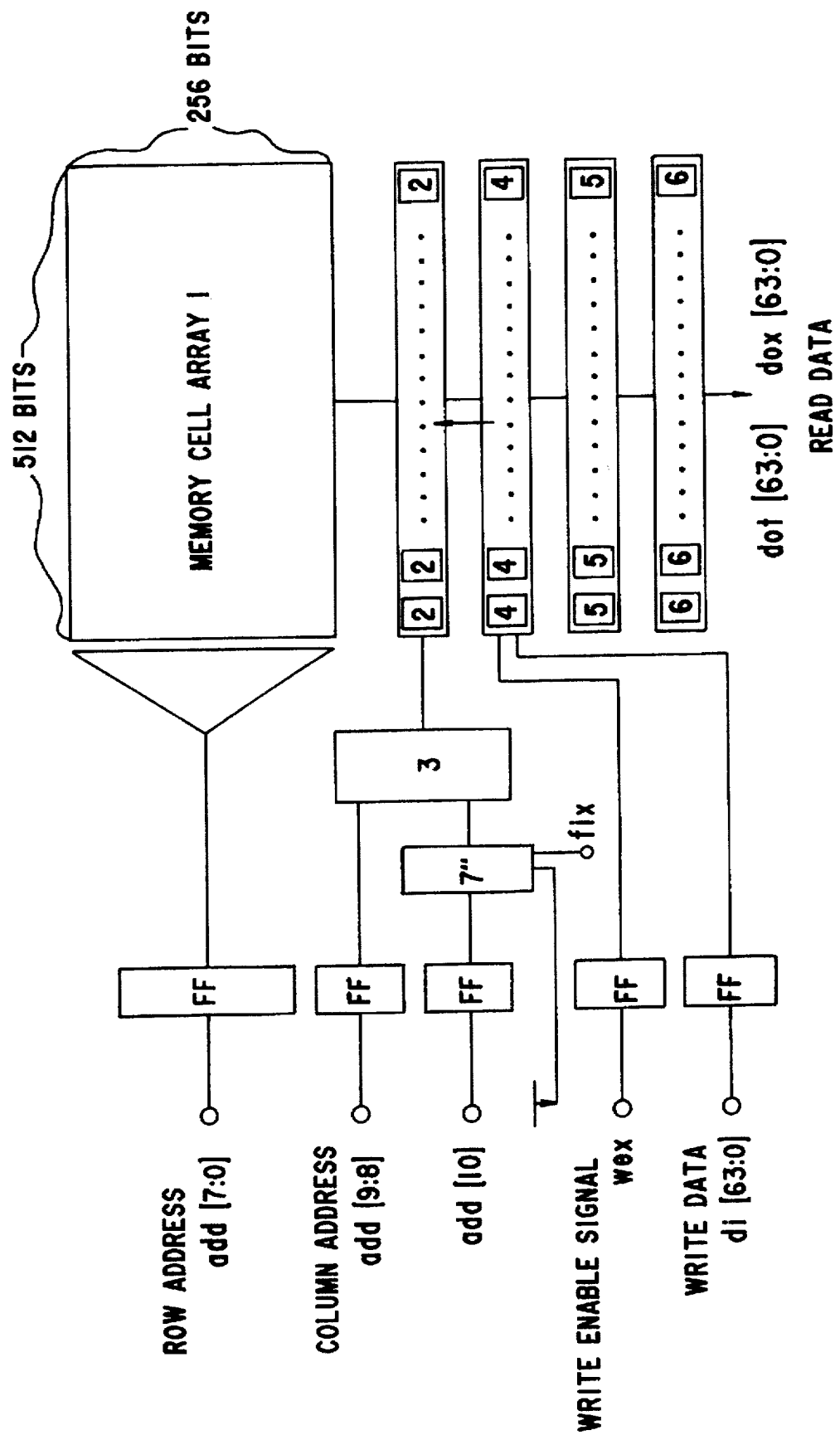
FIG. 9 shows a configuration of a first example of a DM type cache memory device according to the invention.

FIG. 9 shows a configuration of a first example of a DM type cache memory device according to the invention, which may be manufactured in step S2 or S3.

The DM type cache memory device comprises, the memory cell array 1, the sixty-four (64) ⅛ multiplexers 2, a ½ multiplexer 7", the decoder 3 for producing the designation signal, the sixty-four (64) write amplifiers 4, the sixty-four (64) sense amplifiers 5, and the sixty-four (64) buffers 6.

The ½ multiplexer 7" comprises first and second input ends for receiving signals, and always selects and outputs to the decoder 3, according to a fixed input signal fix, the most significant bit add[10] of the address input from the first input end. The first input end corresponds to an input end for receiving the write way signal way__slw of the ½ multiplexer 7' in the SA type cache memory device shown in FIG. 8. The second input end of the ½ multiplexer 7", which is set in an electrically floating state, corresponds to an input end for receiving the read way signal way__slr of the ½ multiplexer 7' shown in FIG. 8. If the ½ multiplexer 7" receives the write enable signal wex instead of the fixed signal fix, the ½ multiplexer 7" can select and output one of signals input from the first and the second input ends. The conventional DM type cache memory device does not include any selecting unit for outputting the most significant bit add[10], such as the ½ multiplexer 7".

The decoder 3 receives and decodes address bits. add[9:8] included in the address signal, and the most significant bit add[10] from the ½ multiplexer 7", and outputs the decoded signals to the ⅛ multiplexers 2 as the designated signal. The ⅛ multiplexers 2 designates a region to be accessed in the memory cell array 1 according to the designated signal.

A wiring configuration of the ½ multiplexer 7' of the above described SA type cache memory device can be easily modified so that the ½ multiplexer 7' loses the function of selecting signals, and the SA type cache memory device changes into the DM type cache memory device. A wiring configuration of the ½ multiplexer 7" of the above described DM type cache memory device can be also easily modified so that the ½ multiplexer 7" gets the function of selecting signals, and the DM type cache memory device changes into the SA type cache memory device. Accordingly, the type of the cache memory device can be easily changed in the manufacturing stage.

When the SA type cache memory device manufactured in step S2 of FIG. 7 is changed in step S3, wiring in the device is changed so that the ½ multiplexer 7' receives the fixed signal, fix instead of the write enable signal wex and, further, the most significant bit add[10] of the address is input to the ½ multiplexer 7' instead of the way signals. As a result, the ½ multiplexer 7' always outputs the most significant bit add[10], and the SA type cache device changes into the DM type cache device.

When the DM type cache memory device manufactured in step S2 is changed in step S3, wiring in the device is changed so that the ½ multiplexer 7" receives the write enable signal wex instead of the fixed signal fix and, further, the write way signal way__slw and the read way signal way__slr are input to the ½ multiplexer 7" instead of the most significant bit add[10]. As a result, the ½ multiplexer 7" gets the function of selecting the way signals, and the DM type cache device changes into the SA type cache device.

Figure 10:
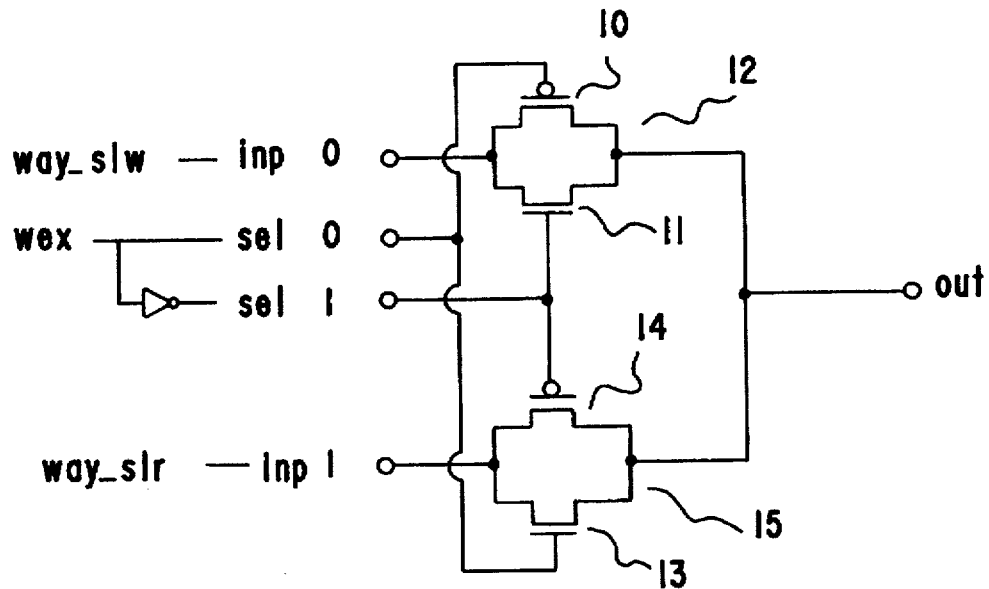
FIG. 10 shows a circuit configuration of a ½ multiplexer used in the SA type cache memory device according to the invention.

FIG. 10 shows a circuit configuration of the ½ multiplexer 7' of the SA type cache memory device.

The ½ multiplexer 7' comprises a transfer-gate circuit 12 which includes a PMOS transistor 10 and a NMOS transistor 11 and passes or interrupts a signal input through a line inp0, and a transfer-gate circuit 15 which includes a PMOS transistor 14 and a NMOS transistor 13 and passes or interrupts a signal input through a line inp1. The gates of the PMOS transistor 10 and the NMOS transistor 13 are connected to a line sel0, and the gates of the NMOS transistor 11 and the PMOS transistor 14 are connected to a line sel1. A normal and an inverted write enable signal wex are transmitted through the lines sel0 and sel1, respectively. When the lines sel0 and sel1 are at a low level and a high level, respectively, the transfer-pate circuit 12 conducts, and the ½ multiplexer 7' outputs the write way signal way__slw input from the line inp0. When the lines sel0 and sel1 are at a high level and a low level, respectively, the transfer-gate circuit 15 conducts, and the ½ multiplexer 7' outputs the read way signal way__slr input from the line inp1.

If the SA type cache memory device is changed to the DM type, the lines sel0 and sel1 are held at the ground level and at a power-source voltage level, respectively, the most significant bit add[10] is input to the line inp0, and the ½ multiplexer 7' always outputs the most significant bit add

[10]. The circuit configuration of the changed ½ multiplexer 7' is the same as that of the ½ multiplexer 7" shown in FIG. 11.

Figure 11:
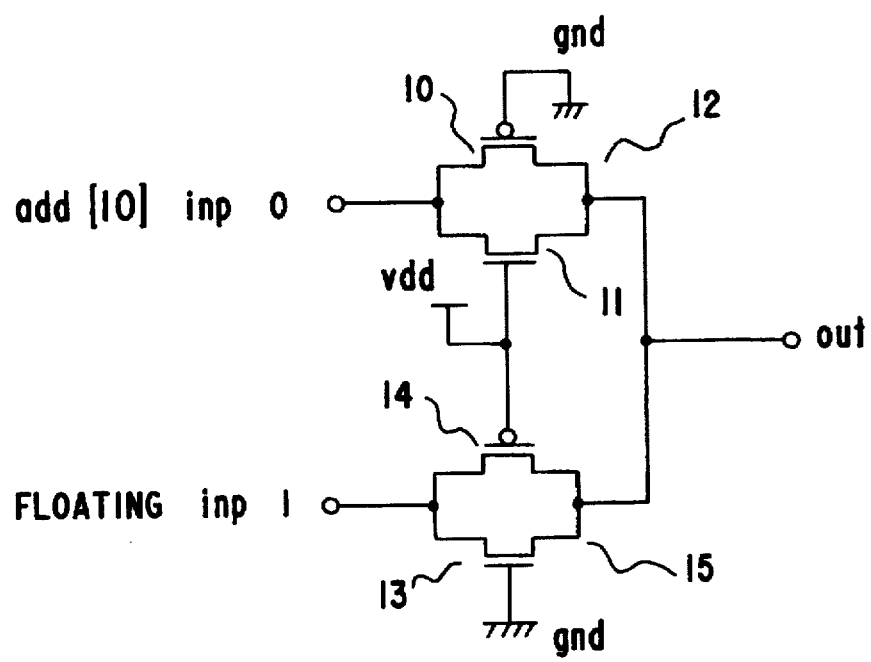
FIG. 11 shows a circuit configuration of a ½ multiplexer used in the DM type cache memory device according to the invention.

FIG. 11 shows the circuit configuration of the ½ multiplexer 7" of the DM type cache memory device.

The ½ multiplexer 7" also comprises a transfer-gate circuit 12 including a PMOS transistor 10 and a NMOS transistor 11, and a transfer-gate circuit 15 including a PMOS transistor 14 and a NMOS transistor 13. The gates of the PMOS transistor 10 and the NMOS transistor 13 are at the ground voltage level gnd, and the gates of the NMOS transistor 11 and the PMOS transistor 14 are at the power source voltage level vdd. Therefore, the transfer-gate circuit 12 is held in the conduction state, and the ½ multiplexer 7" always outputs the most significant bit add[10] input from the line inp0. In this case, the line sel1 is set in a electrically floating state.

If the DM type cache memory device is changed to the SA type, the circuit configuration of the ½ multiplexer 7" becomes the same configuration as shown FIG. 10, and one of the write way signal way_slw and the read way signal way_slr is selected and output according to the write enable signal wex.

Next, referring to FIGS. 12 through 17, structures of the ½ multiplexers 7' and 7" will be described.

Figure 12:
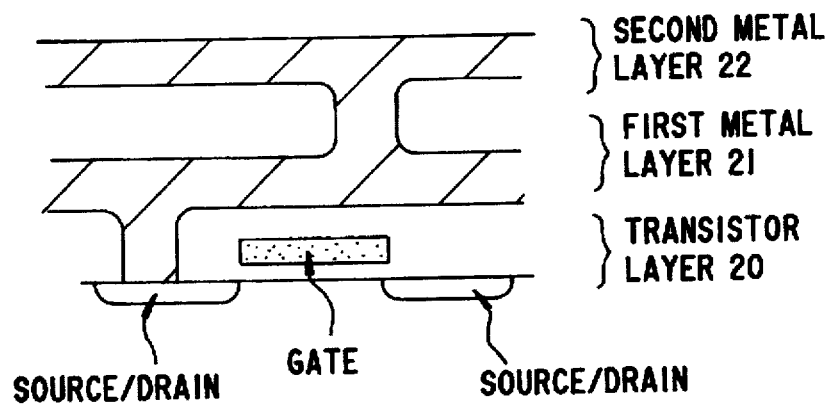
FIG. 12 shows a cross-sectional view of the ½ multiplexer according to the invention.

FIG. 12 shows a cross-sectional view of the ½ multiplexers 7' and 7". Each of the ½ multiplexers 7' and 7" includes a transistor layer 20 in which the PMOS transistors 10 and 14 and the NMOS transistors 11 and 13 are formed, and a first metal layer 21 and a second metal layer 22 formed above the transistor layer 20 by a masking technique, as shown in FIG. 12.

Figure 13:
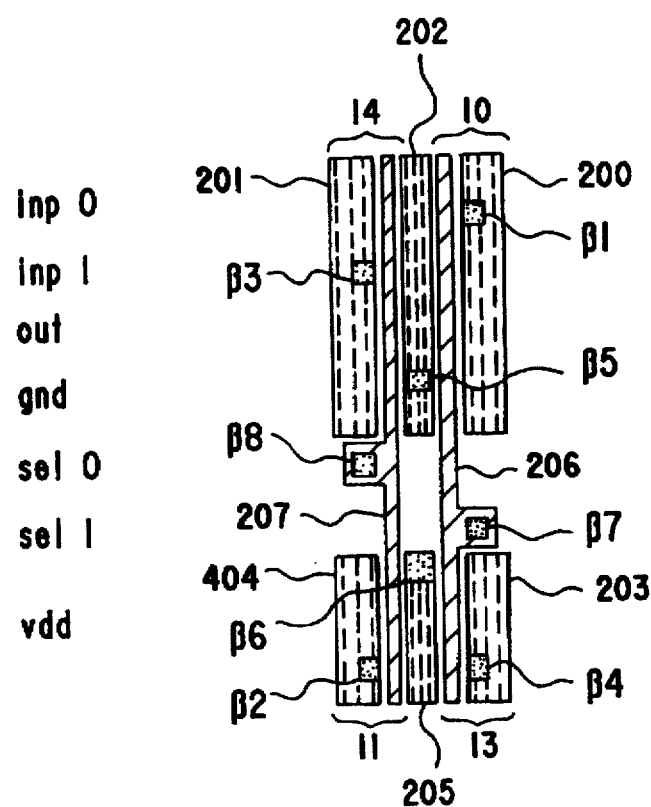
FIG. 13 shows a configuration of a transistor layer of the ½ multiplexer according to the invention.

FIG. 13 shows a configuration of the transistor layer 20 of each of the ½ multiplexers 7' and 7". As shown in this figure, the transistor layer 20 includes P-type diffusion areas 200, 201, and 202 which form the source/drain regions of the PMOS transistors 10 and 14, N-type diffusion areas 203, 204, and 205 which form the source/drain regions of the NMOS transistors 11 and 13, and polysilicon areas 206 and 207 which respectively form the gates of the transistors 10 and 13 and the gates of the transistors 11 and 14. Marks β1 through β8 in FIG. 13 represent connection points between the areas 200 to 207 of the transistor layer 20 and the first metal layer 21, and inp0 to vdd listed on the left side of FIG. 13 represent metal lines in the second metal layer 22.

Figure 14:
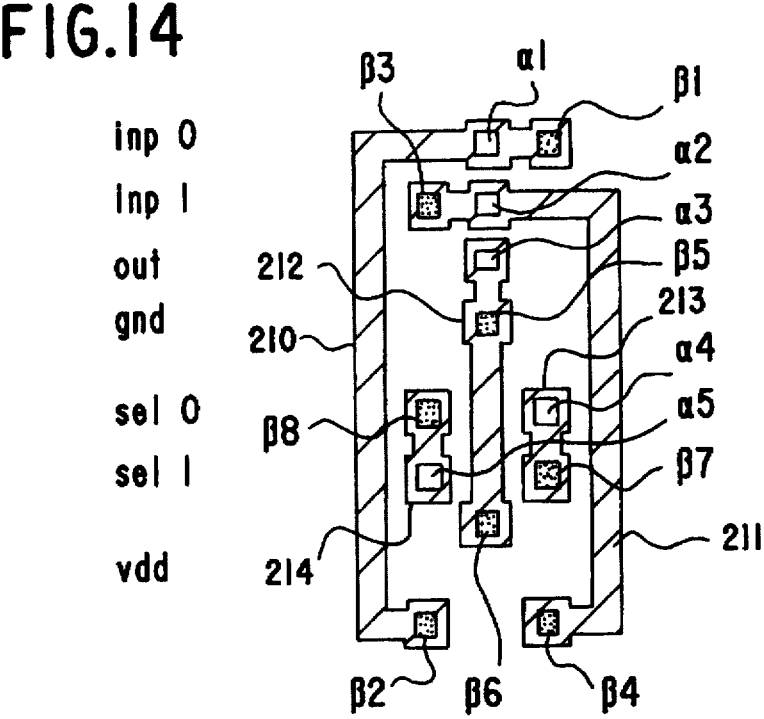
FIG. 14 shows a configuration of a first metal layer of the ½ multiplexer according to the invention.

FIG. 14 shows a configuration of the first metal layer 21 of each of the ½ multiplexer 7' and 7". The first metal layer 21 includes a line 210 connected to the connection points β1 and β2, a line 211 connected to the connection points β3 and β4, a line 212 connected to the connection points β5 and β6, a line 213 connected to the connection point β7, and a line 214 connected to the connection point β8. These lines are formed as thin-film metal lines. Marks α1 to α5 in FIG. 14 respectively represent connection points between the lines 210 to 214 of the first metal layer 21 and the second metal layer 22.

Figure 15:
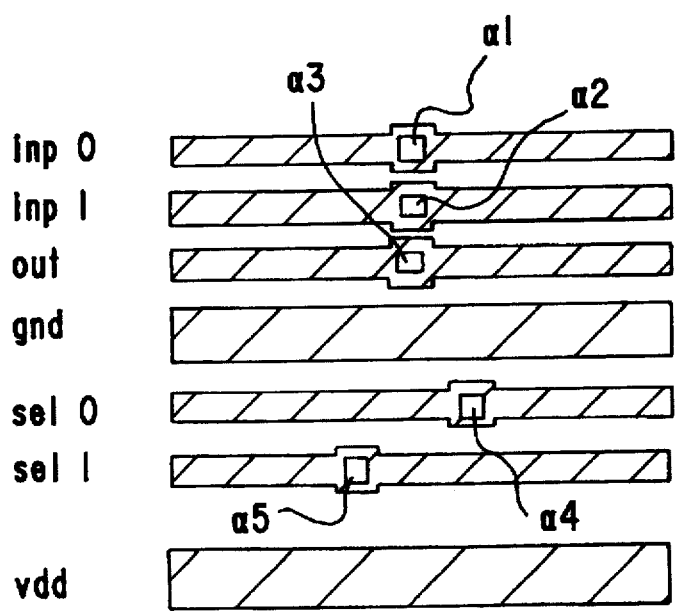
FIG. 15 shows a configuration of a second metal layer of the ½ multiplexer according to the invention.

FIG. 15 shows a configuration of the second metal layer 22. The second metal layer 22 includes a line inp0 connected to the connection point α1, a line inp1 connected to the connection point α2, a line out connected to the connection point α3, a line sel0 connected to the connection point α4, a line sel1 connected to the connection point α5, and lines gnd and vdd. The lines gnd and vdd transmit a ground level potential for the bias voltage and a potential of a power source, respectively. These lines in the second metal layer are also formed as thin-film metal lines. The lines sel0 and gnd are formed so as to be adjacent to each other, and the lines sel1 and vdd are also formed as being adjacent to each other. No parallel line is formed between the lines sel0 and gnd and between the lines sel1 and vdd in the second layer. The configuration of the second metal layer shown in FIG. 15 is for the ½ multiplexer 7' of the SA type cache memory device.

In the ½ multiplexer of this invention having the above described connection form, a signal input to the line inp0 of the second metal layer 22 is transmitted to the line 210 of the first metal layer 21 through the connection point α1, and further transmitted to the P-type diffusion area 200 and the N-type diffusion area 204 of the transistor layer 200 through the connection points β1 and β2, respectively. A signal input to the line inp1 of the second metal layer 22 is transmitted to the line 211 of the first metal layer 21 through the connection point α2, and further transmitted to the P-type diffusion area 201 and the N-type diffusion area 203 of the transistor layer 200 through the connection points β3 and β4, respectively. The line out of the second metal layer 22 is connected to the line 212 of the first metal layer 21 through the connection point α3, and further connected to the P-type diffusion area 202 and the N-type diffusion area 205 of the transistor layer 200 through the connection points β5 and β6, respectively. A signal input to the line sel0 of the second metal layer 22 is transmitted to the line 213 of the first metal layer 21 through the connection point α4, and further transmitted to the polysilicon area 206 of the transistor layer 200 through the connection point β7. A signal input to the line sel1 of the second metal layer 22 is transmitted to the line 214 of the first metal layer 21 through the connection point α5, and further transmitted to the polysilicon area 207 of the transistor layer 200 through the connection point β8.

When the SA type cache memory device is manufactured in step S2 of FIG. 7, the second metal layer shown in FIG. 15 is formed for the ½ multiplexer using a mask pattern.

Figure 16:
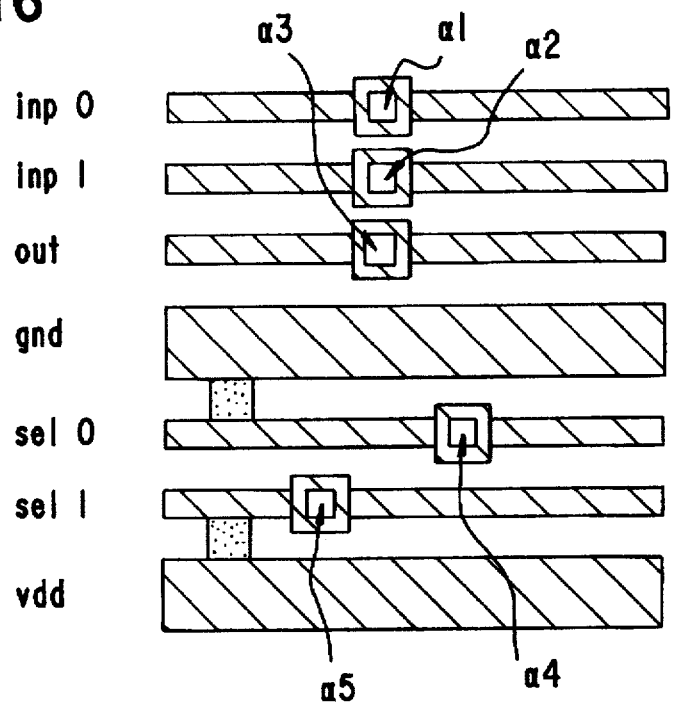
FIG. 16 shows a connecting process of the second metal layer of the ½ multiplexer according to the invention.

FIG. 16 shows a line change process for the second metal layer used when the SA type cache memory device is changed to the DM type in step S3 of FIG. 7. Diagonally shaded areas in FIG. 16 indicate the lines inp0 through vdd formed in step S2. In step S3, the lines gnd and sel0 and the lines sel1 and vdd are respectively connected to each other by, for example, a focused ion beam. Black areas in FIG. 16 indicate the connected portions. As a result, the ground level potential for the bias voltage on the line gnd is transmitted to the polysilicon area 206 of the transistor layer 20, which corresponds to the gates of the transistors 10 and 13, through the line sel0 and the connection points α4 and β7. Furthermore, the potential of the power source on the line vdd is transmitted to the polysilicon area 207 of the transistor layer 20, which corresponds to the gates of the transistors 11 and 14, through the line sel1 and the connection points α5 and β8.

The ½ multiplexer changed by the above described manner has the circuit configuration shown in FIG. 11 and always outputs the most significant bit add[10] of the input address instead of the way signal. Accordingly, the type of the cache memory device is changed to the DM type.

Figure 17:
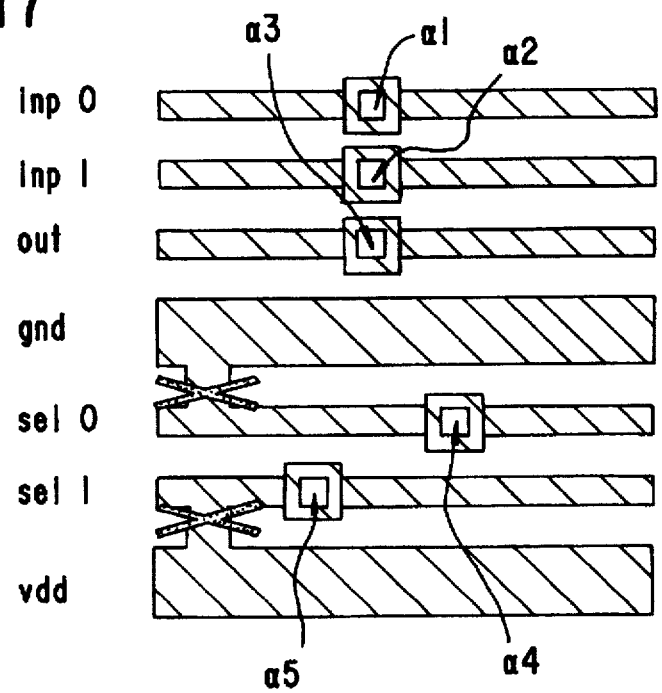
FIG. 17 shows a isolating process of the second metal layer of the ½ multiplexer according to the invention.

FIG. 17 shows a line change process for the second metal layer used when the DM type cache memory device is changed to the SA type in step S3 of FIG. 7. Diagonal shaded areas in FIG. 17 indicate the lines inp0 through vdd of the second metal layer in the ½ multiplexer 7" formed in step S2 by a mask pattern. In this case, both of the connection areas between lines gnd and sel0 and the lines sel1 and vdd are cut by, for example, a laser cutter in step S3, as shown by X marks in this figure. As a result, the lines gnd and sel0 and the lines sel1 and vdd are respectively electrically isolated from each other and the circuit configuration of the ½ multiplexer is changed to that as shown in FIG. 10. In addition, the way signal is input to the lines inp0 and inp1 and the write enable signal is input to the lines sel0 and sel1, so that the type of the cache memory device is changed to the SA type.

Figure 18:
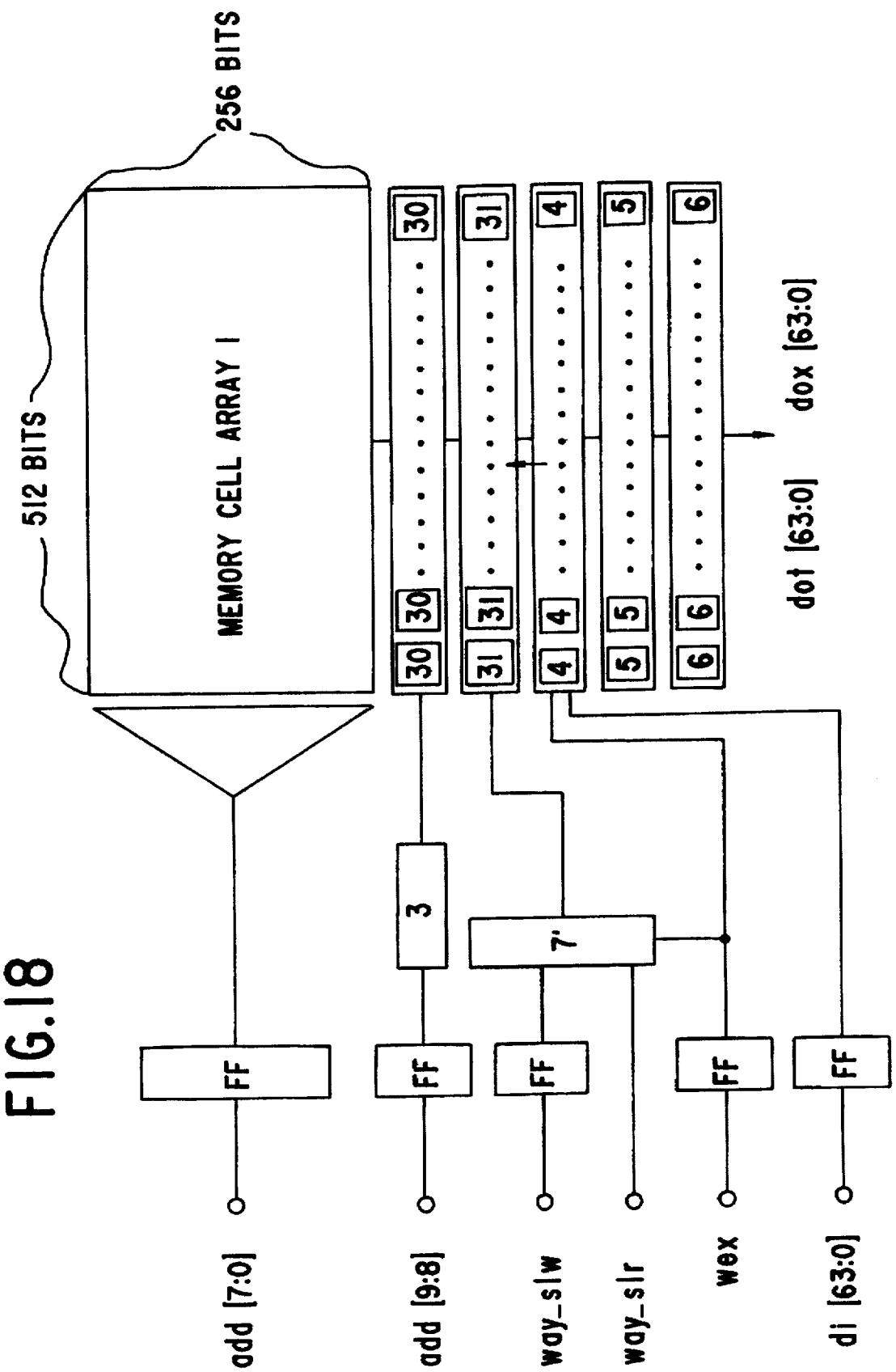
FIG. 18 shows a configuration of a second example of an SA type cache memory device according to the invention.

FIG. 18 shows a configuration of a second example of an SA type cache memory device according to the invention. The cache memory device shown in this figure may be also manufactured in step S2 or step S3 in FIG. 7, and enables faster accesses than the SA type cache memory device shown in FIG. 8.

In the SA type cache memory device shown in FIG. 18, one hundred and twenty-eight (128) ¼ multiplexers 30, each of which performs four input and one output or one input and four output processes, and sixty-four (64) ½ multiplexers 31, each of which performs two input and one output or one input and two output processes, are used instead of the sixty-four (64) ⅛ multiplexers 2 of the cache memory device shown in FIG. 8. According to the upper two bits add[9:8] of an address decoded by the decoder 3, the ¼ multiplexers 30 select one hundred and twenty-eight (128) memory regions in a row of the memory cell array 1 designated by a row address add[7:0]. The ½ multiplexers 31 further sixty-four (64) memory regions, which are the destinations of the access, in the selected one hundred and twenty-eight (128) memory regions, according to the way signal (selection signal) selected by the ½ multiplexer 7'. In this way, the sixty-four bit regions of the data to be read or to be written are designated.

In SA type cache memory devices, an amount of time is required for determining the way signal after the address is obtained. The cache memory device of the second example enables faster data accesses, especially for read data, because the ½ multiplexers 31 can select the memory regions according to a way signal at the time when the way signal is determined after the ¼ multiplexers 30 select the 128 memory regions according to the upper two bits add [9:8] of the address.

Figure 19:
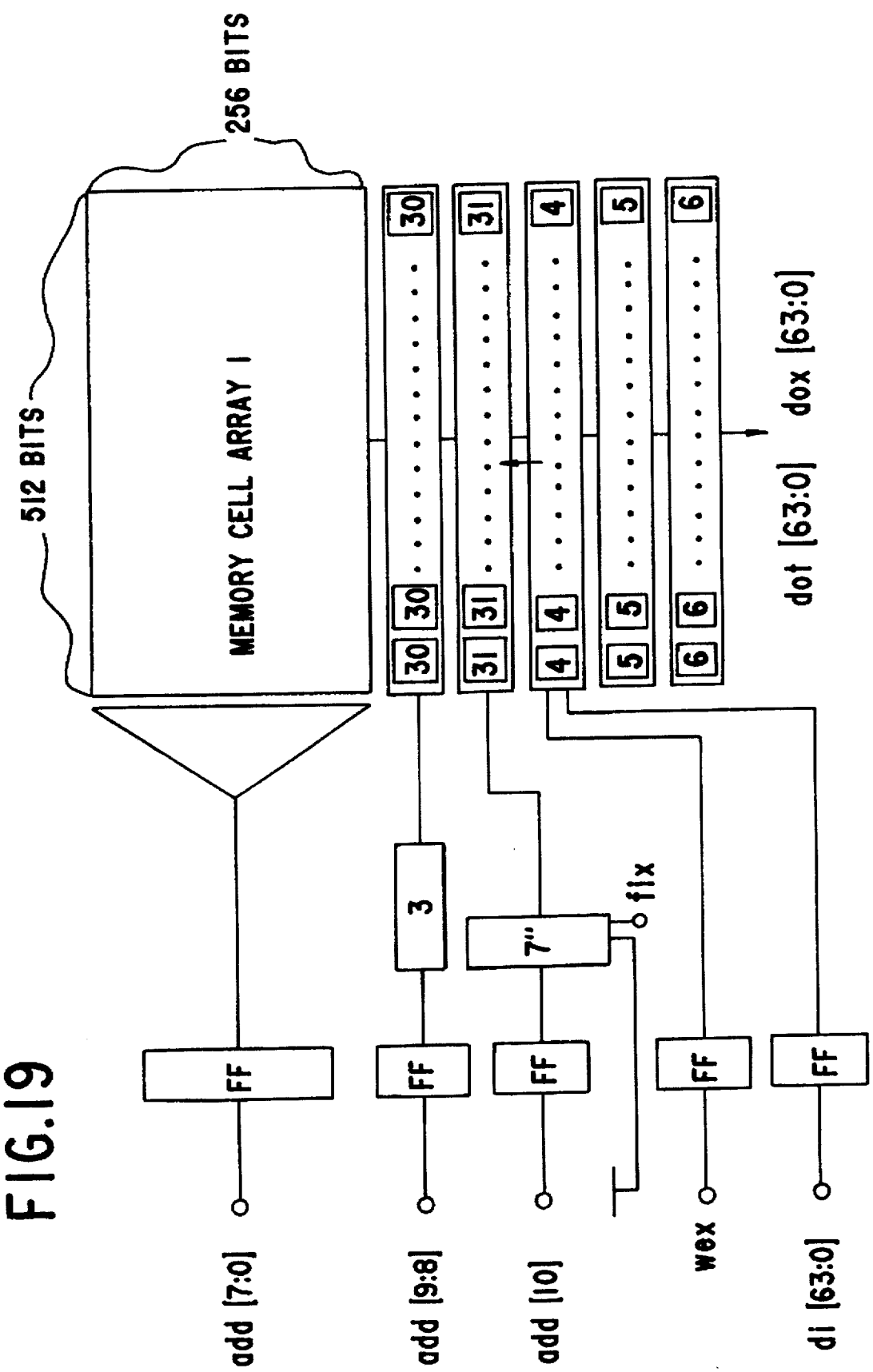
FIG. 19 shows a configuration of a second example, of a DM type cache memory device according to the invention.

FIG. 19 shows a configuration of a second example of a DM type cache memory device, which may be manufactured in step S2 or step S3 of FIG. 7. This cache memory device also enables faster accesses than the DM type cache memory device shown in FIG. 9. Even though the functions and the placements of the one hundred and twenty eight (128) ¼ multiplexers 30 and the sixty-four (64) ½ multiplexers 31 are the same as those of the cache memory device shown in FIG. 18, the ½ multiplexers 31 receive the most significant bit add[10] of the input address through the ½ multiplexer 7". The conventional DM type cache memory device does not include a unit such as the ½ multiplexer 7".

The SA type cache memory device shown in FIG. 18 may be changed to the DM type cache memory device shown in FIG. 19 by modifying the line pattern of the ½ multiplexer 7' and changing the signals input to the ½ multiplexer 7' to the most significant bit add[10] from the way signals. Further, the DM type cache memory device shown in FIG. 19 may be changed to the SA type cache memory device shown in FIG. 18 by the reverse manner.

Figure 20:
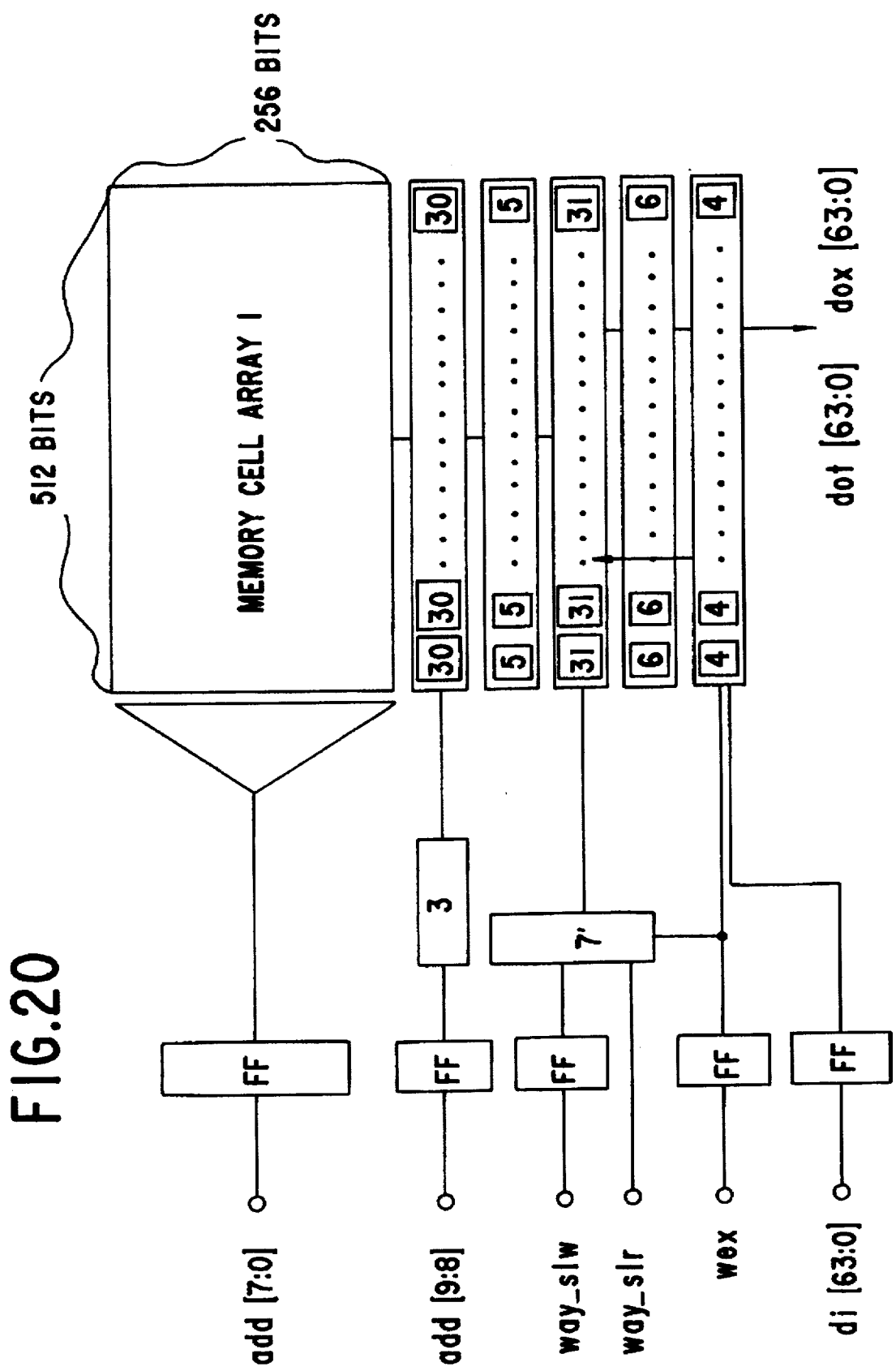
FIG. 20 shows a configuration of a third example of an SA type cache memory device according to the invention.

FIG. 20 shows a configuration of a third example of an SA type cache memory device according to the invention. This cache memory device may be also manufactured in step S2 or step S3 in FIG. 7, and enables faster accesses than the SA type cache memory device shown in FIG. 18.

In the SA type cache memory device shown in FIG. 20, one hundred and twenty-eight (128) sense amplifiers 5 are placed between the ¼ multiplexers 30 and the ½ multiplexers 31 of FIG. 18. In the read process for the cache data, one hundred and twenty-eight data selected by the ¼ multiplexers 30 are fixed and set in a output-enable state by the sense amplifiers 5 before the ½ multiplexers 31 receive the read way signal way_slr. Then, the read data of 64 bits are selected by the ½ multiplexers 31 at the time when the read way signal way_slr is received. In consideration of the low speed performance of the sense amplifiers, the sense amplifiers 5 are set to perform before the read way signal way_slr is received, thereby realizing high-speed read accesses.

Figure 21:
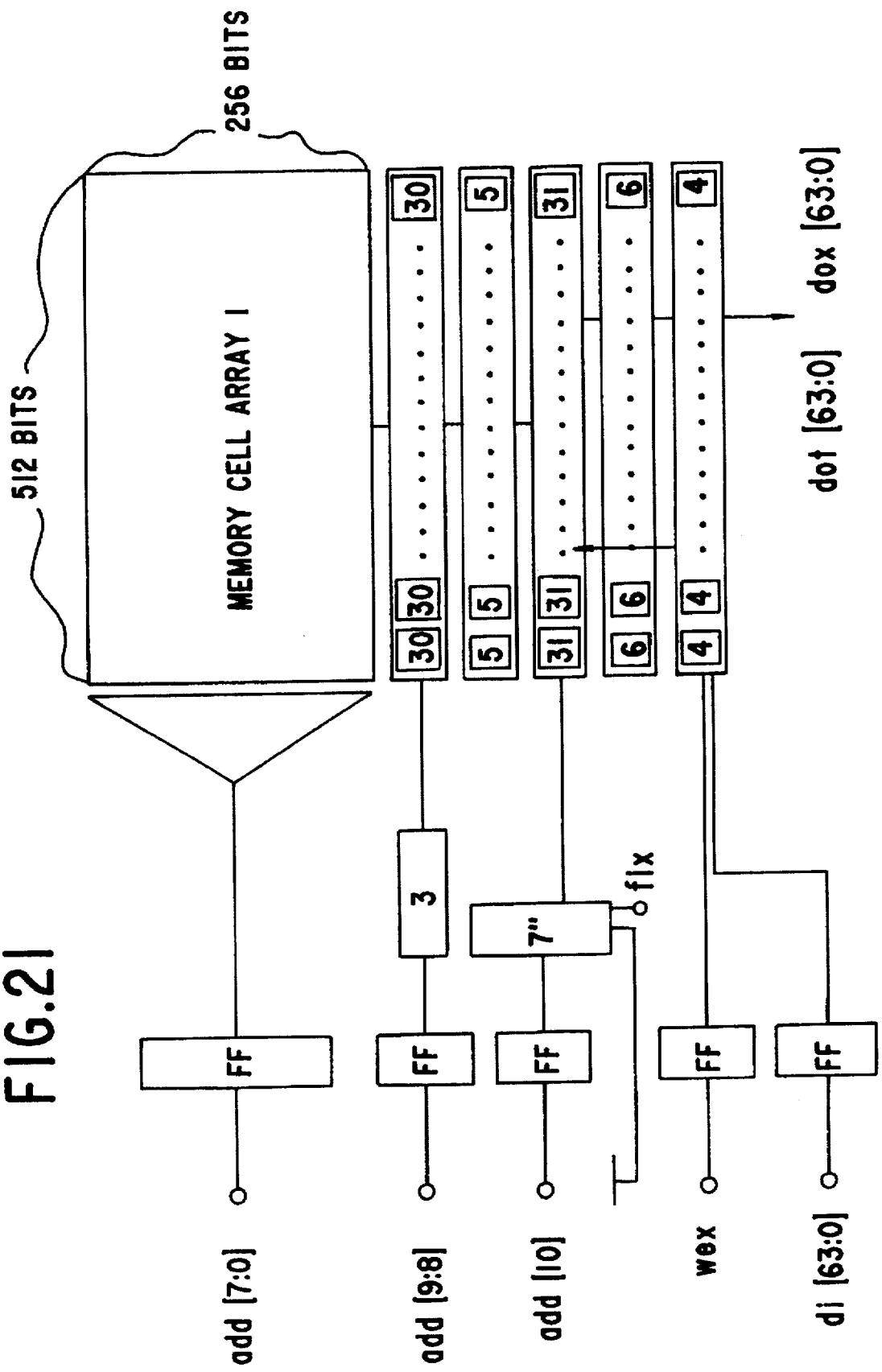
FIG. 21 shows a configuration of a third example of a DM type cache memory device according to the invention.

FIG. 21 shows a configuration of a third example of a DM type cache memory device according to the invention, which may be manufactured in step S2 or step S3 of FIG. 7. This cache memory device also enables faster accesses than the DM type cache memory device shown in FIG. 19. Even though the functions and the placements of the ¼ multiplexers 30, the ½ multiplexers 31, and the sense amplifiers 5, are the same as those of the cache memory device shown in FIG. 20, the ½ multiplexers 31 receive the most significant bit add[10] of the input address through the ½ multiplexer 7".

The SA type cache memory device shown in FIG. 20 may be changed to the DM type cache memory device shown in FIG. 21 by modifying the line pattern of the ½ multiplexer 7' and changing the signals input to the ½ multiplexer 7' to the most significant bit add[10] from the way signals. Further, the DM type cache memory device shown in FIG. 21 may be changed to the SA type cache memory device shown in FIG. 20 by the reverse manner.

Figure 22:
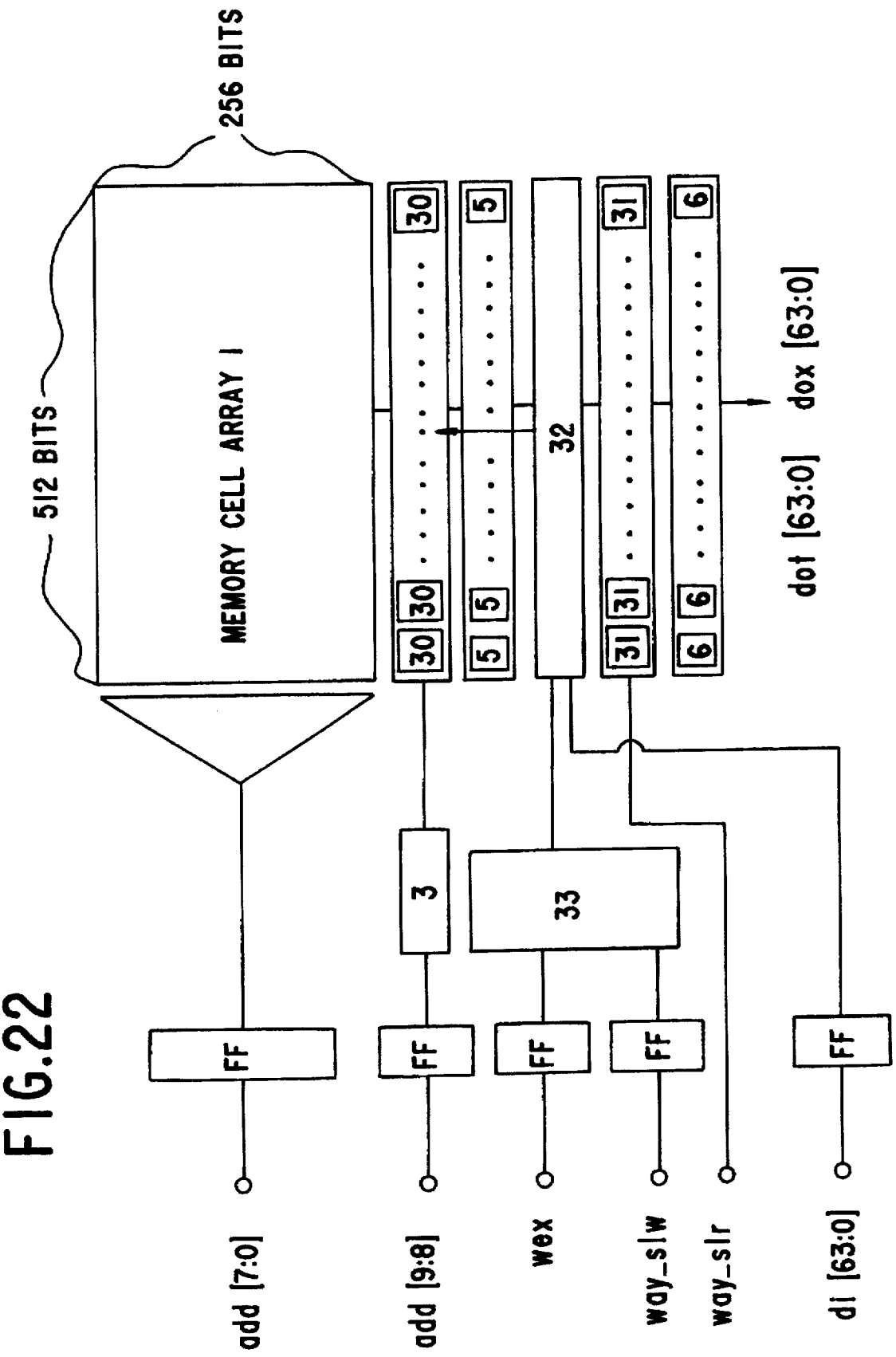
FIG. 22 shows a configuration of a fourth example of an SA type cache memory device according to the invention.

FIG. 22 shows a configuration of a fourth example of an SA type cache memory device according to the invention, which may be manufactured in step S2 or step S3 in FIG. 7. This cache memory device enables faster accesses than the SA type cache memory device shown in FIG. 20.

For higher speed data access, the SA type cache memory device of this example comprises a write control logic circuit 33 and a write amplifier 32 of a tri-state buffer type, which are used for writing data instead of the ½ multiplexer 7' and the write amplifiers 4 of the third example shown in FIG. 20. The write control logic circuit 33 provides write selection signals for the write amplifier 32, which is placed between the ¼ multiplexers 30 and the ½ multiplexers 31.

The ½ multiplexers 31 select the memory regions according to the read way signal way_slr only when the cache data are read. Since the read way signal way_slr is directly input to the ½ multiplexers 31 and is not input to any selecting unit, such as the ½ multiplexer 7', a high-speed read access is realized.

Figure 23:
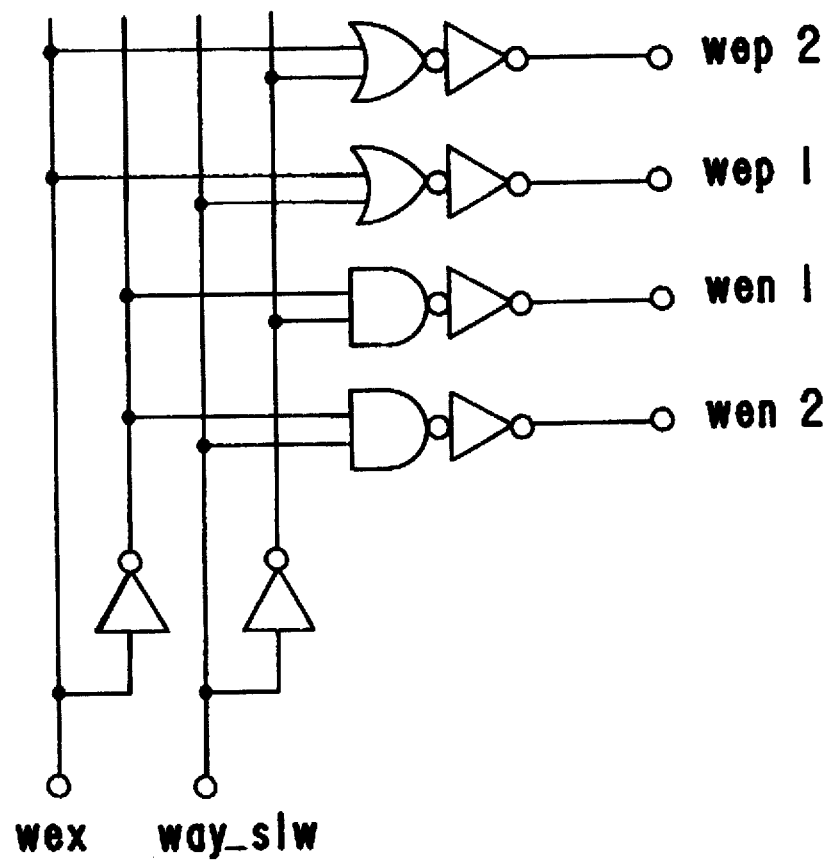
FIG. 23 shows a configuration of a write control logic circuit used in the fourth example.

FIG. 23 shows a configuration of the write control logic circuit 33 used in the fourth example shown in FIG. 22.

The write control logic circuit 33 receives the write enable signal wex and the write way signal way_slw and outputs write selection signals wen1, wep1, wen2, and wep2 to the write amplifiers 32. When the received write enable signal wex is at a low level, which indicates a writing mode, and the received write way signal way_slw is at a high level, which indicates a second way, the write control logic circuit 33 outputs the write selection signals wen1, wep1, wen2, and wep2 at low, high, high, and low levels, respectively.

Figure 24:
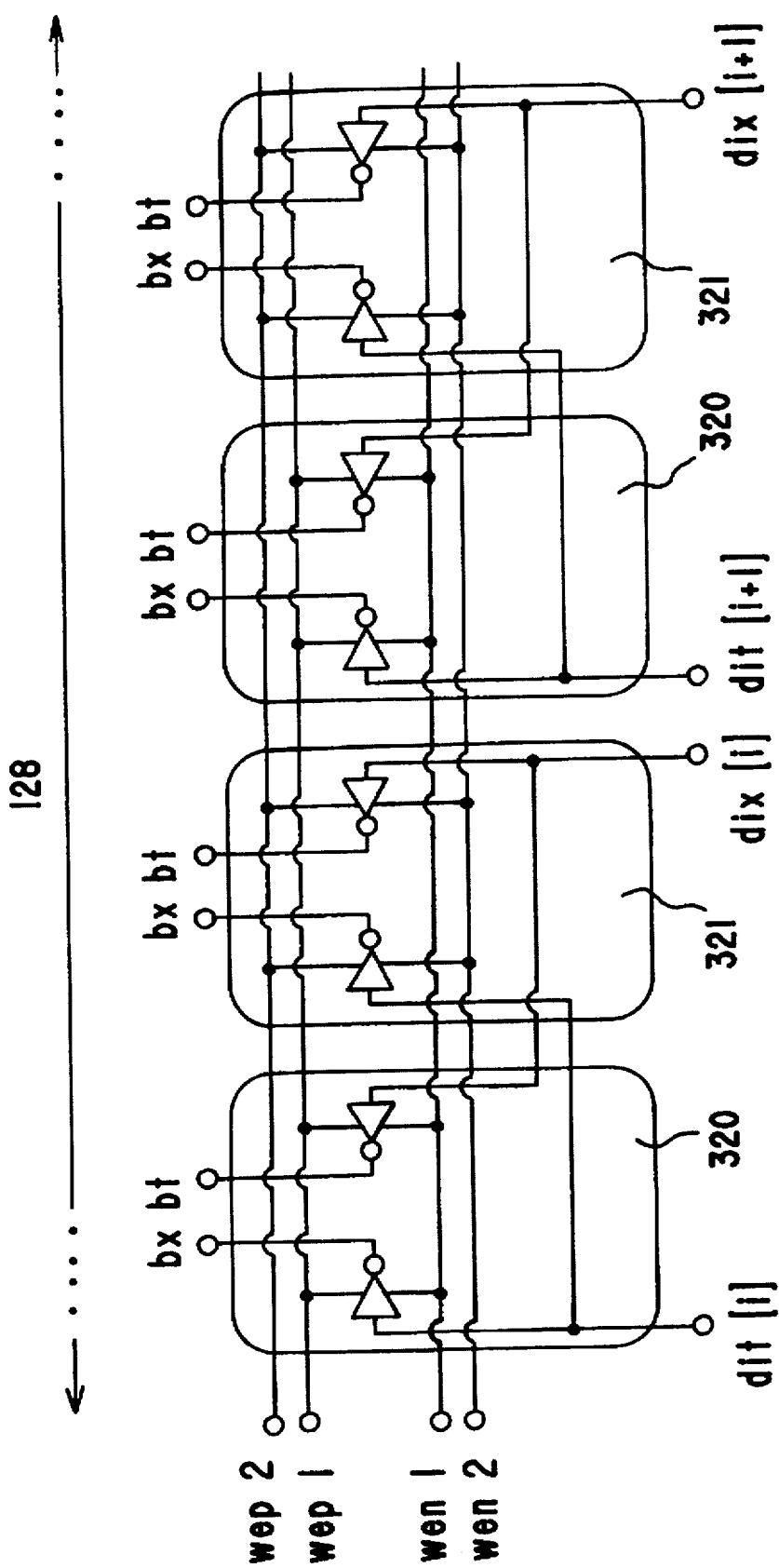
FIG. 24 shows a configuration of a write amplifier used in the fourth example.

FIG. 24 shows a configuration of the write amplifier 32 used in the fourth example shown in FIG. 22.

The write amplifier 32 comprises sixty-four (64) pairs of basic circuits 320 and 321. The basic circuit 320 determines whether to pass or to cut off the input cache data dit[i] and dix[i] according to the write selection signals wen1 and wep1 received from the write control logic circuit 33. When the basic circuit 320 passes the cache data dit[i] and dix[i], these data are output as signals bx and bt respectively. The basic circuit 321 also determines whether to pass or to cut off the input cache data dit[i] and dix[i] according to the write selection signals wen2 and wep2 received from the write control logic circuit 33. When the basic circuit 321 passes the cache data dit[i] and dix[i], these data are also output as signals bx and bt, respectively.

Each of the sixty-four (64) pairs of the basic circuits 320 and 321 receives one of the 64 bits cache data, and the same cache data dit[i] and dix[i] are input to both basic circuits 320 and 321 as a pair. If a high level and a low level are set to the cache data dit[i] and dix[i], respectively, "1" is written to a memory region of the memory cell array 1, and if a low level and a high level are set to the cache data dit[i] and dix[i], respectively, "0" is written to a memory region of the memory cell array 1.

In the write amplifier 32 having above described configuration, when the input write selection signals wen1, wep1, wen2, and wep2 indicate high, low, low, and high levels respectively, the basic circuits 320 conduct and the basic circuits 321 stop conducting (hi-impedance state). In this way, the input 64 bits write data dit[i] and dix[i] are output to the multiplexers 30 through the basic circuits 320. When the input write selection signals wen1, wep1, wen2, and wep2 indicate low, high, high, and low levels respectively, the basic circuits 320 and 321 are stop conducting and conduct respectively, and the input write data dit[i] and dix[i] are output to the ¼ multiplexers 30 through the basic circuits 321.

As described above, the write amplifier 32 performs the same data selection function as the ½ multiplexers 31 for writing cache data into the memory cell array 1, and the ½ multiplexers 31 operate only when cache data are read out. Therefore, the read way signal way__slr can be directly input to the ½ multiplexers 31, and a high speed cache data reading can be realized.

Figure 25:
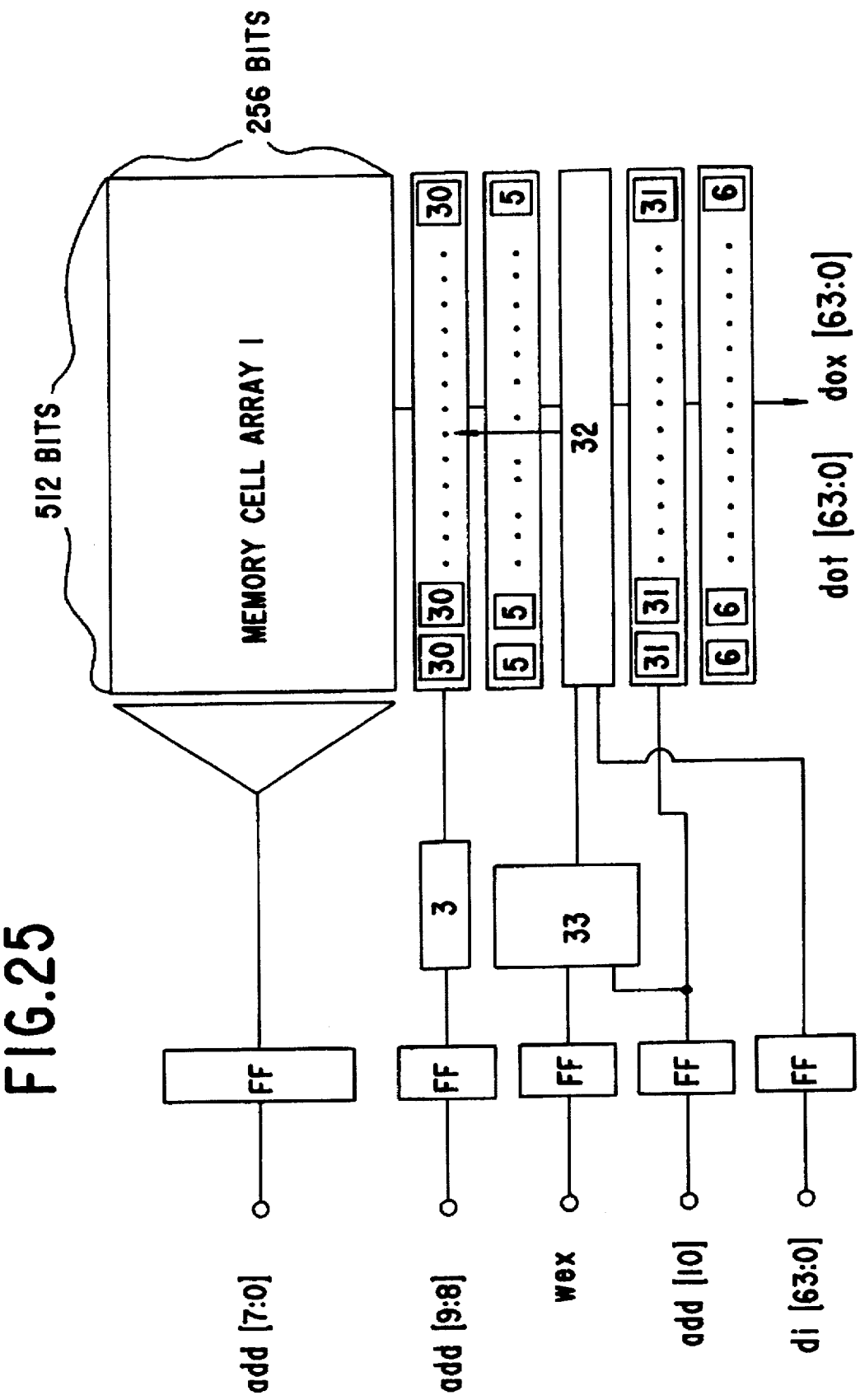
FIG. 25 shows a configuration of a fourth example of a DM type cache memory device according to the invention.

FIG. 25 shows a configuration of a fourth example of a DM type cache memory device according to the invention, which may be manufactured in step S2 or step S3 of FIG. 7. This cache memory device also enables faster accesses than the DM type cache memory device shown in FIG. 21. Even though the functions and the placements of the write amplifier 32 and the write control logic circuit 33 are the same as those of the cache memory device shown in FIG. 22, the most significant bit add[10] of the input address is input to both the ½ multiplexers 31 and the write control logic circuit 33, instead of the read way signal way__slr and the write way signal way__slw.

The SA type cache memory device shown in FIG. 22 may be changed to the DM type cache memory device shown in FIG. 25 by modifying the line pattern of the ½ multiplexer 7' and changing the signal input to the write control logic circuit 33 to the most significant bit add[10] from the way signal. Further, the DM type cache memory device shown in FIG. 25 may be changed to the SA type cache memory device shown in FIG. 22 by the reverse manner.

The conventional SA type and DM type cache memory devices do not include any of the ¼ multiplexers 30, ½ multiplexers 31, 128 sense amplifiers 5, write amplifier 32, and write control logic circuit 33.

The present invention is not limited to the above described examples, and cache memory devices in which different numbers of elements and data and different values are used, are included in the range of the invention. Furthermore, devices including elements having the same functions as those performed in the above described elements are also included in the range of the invention.

What is claimed is:

1. A method for manufacturing a cache memory device for writing cache data into and reading cache data from a storing region of memory means designated according to a selection signal from a selecting means and a designation signal produced using a first portion of an address signal, the method including:

a first step of manufacturing a common base of the selecting means applicable to both a direct-map type cache memory device and a set-associative type cache memory device; and a second step of manufacturing one of a direct-map type cache memory device comprising the selecting means including the common base and outputting a second portion of the address signal as the selection signal, and a set-associative type cache memory device comprising the selecting means including the common base and selectively outputting one of a write way signal and a read way signal as the selection signal according to a write enable signal.

2. The method according to claim 1, further including a third step of changing the type of the cache memory device manufactured in the second step to the other type.

3. The method according to claim 1, wherein the first includes steps of forming a transistor layer and forming a first metal layer above the transistor layer, the transistor layer and the first metal layer being included in the common base, and the second step includes a step of forming a second metal layer above the first metal layer by a masking technique so that one of wiring patterns of a direct-map type cache memory device and a set-associative type cache memory device is determined.

4. The method according to claim 3, ,wherein the first step includes a step of forming a first transfer-gate circuit and a second transfer-gate circuit in the transistor layer, and the second step includes a step of forming, in the second metal layer, a first metal line and a second metal line which are used for transmitting signals for bringing one of the first and the second transfer-gate circuits into conduction for outputting the selection signal, a third metal line for transmitting a first potential, and a fourth metal line for transmitting a second potential, the first and the third metal lines and the second and the fourth metal lines being adjacent to each other, respectively.

5. The method according to claim 4, further including a third step of changing the type of the cache memory device manufactured in the second step, wherein when the direct-map type cache memory device is manufactured in the second step, the first and the third metal lines and the second and the fourth metal lines are electrically connected each other, respectively, in the formed second metal layer, and the first and the third metal lines and the second and the fourth metal lines are electrically isolated from each other, respectively, in the third step.

6. The method according to claim 5, wherein the first and the third metal lines and the second and the fourth metal lines are electrically isolated from each other, respectively, by use of a laser cutter in the third step.

7. The method according to claim 4, further including a third step of changing the type of the cache memory device manufactured in the second step, wherein when the set-associative type cache memory device is manufactured in the second step, the first and the third metal lines and the second and the fourth metal lines are electrically isolated from each other, respectively, and the first and the third metal lines and the second and the fourth metal lines are electrically connected each other, respectively, in the third step.

8. The method according to claim 7, wherein the first and the third metal lines and the second and the fourth metal lines are electrically connected each other, respectively, by use of an ion beam in the third step.

9. A method for manufacturing a cache memory device for writing cache data into and reading cache data from a storing region of memory means designated according to a selection signal and a designation signal produced using a first portion of an address signal, the method including the steps of:

forming write control logic means for generating a write region selection signal according to a write enable signal and a write amplifier for designating a storing region of the memory means for writing cache data according to the write region selection signal; and manufacturing one of a set-associative type cache memory device and a direct-map type cache memory device using the write control logic means and the write amplifier means, a line for inputting a write way signal to the write control logic means being formed when the set-associative type cache device is manufactured, and a line for inputting a second portion of the address signal to the write control logic means being formed when the direct-map cache memory device is manufactured.

10. A method for manufacturing a cache memory device for writing cache data into and reading cache data from a storing region of memory means designated according to a selection signal from selecting means and a designation signal produced using a first portion of an address signal, the method including:

a first step of forming a transistor layer of the selecting means including a first transfer-gate circuit and a second transfer-gate circuit; and a second step of forming a metal layer including a first metal line and a second metal line which are used for transmitting signals for bringing one of the first and the second transfer-gate circuits into conduction for outputting the selection signal, a third metal line for transmitting a first potential, and a fourth metal line for transmitting a second potential, for manufacturing a set-associative type cache memory device, the first and the third metal lines and the second and the fourth metal lines being adjacent to each other, respectively.

11. The method according to claim 10, further including a third step of electrically connecting the first and the third metal lines and the second and the fourth metal lines, respectively, for manufacturing a direct-map type cache memory device.

12. The method according to claim 11, wherein the first and the third metal lines and the second and the fourth metal lines are connected to each other, respectively, by use of an ion beam in the third step.

13. A method for manufacturing a cache memory device for writing cache data into and reading cache data from a storing region of memory means designated according to a selection signal from selecting means and a designation signal produced using a first portion of an address signal, the method including:

a first step of forming a transistor layer of the selecting means including a first transfer-gate circuit and a second transfer-gate circuit; and a second step of forming a metal layer including a first metal line and a second metal line which are used for transmitting signals for bringing one of the first and the second transfer-gate-circuits into conduction for outputting the selection signal, a third metal line for transmitting a first potential electrically connected to the first metal line, and a fourth metal line for transmitting a second potential connected to the fourth metal line, for manufacturing a direct-map type cache memory device.

14. The method according to claim 13, further including a third step of electrically isolating the first and the third metal lines and the second and the fourth metal lines from each other, respectively, for manufacturing a set-associative type cache memory device.

15. The method according to claim 13, wherein the first and the third metal lines and the second and the fourth metal lines are isolated from each other, respectively, by use of a laser cutter in the third step.

* * * * *